(12) United States Patent
Kakuta et al.

(10) Patent No.: US 8,019,874 B2
(45) Date of Patent: Sep. 13, 2011

(54) APPARATUS FOR DELIVERING INFORMATION AND METHOD THEREFOR

(75) Inventors: Jun Kakuta, Kobe (JP); Masahiko Murakami, Kobe (JP); Takashi Ohno, Kobe (JP); Shingo Fujimoto, Kobe (JP); Akinori Iwakawa, Akashi (JP); Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1233 days.

(21) Appl. No.: 10/766,026

(22) Filed: Jan. 29, 2004

(65) Prior Publication Data

US 2004/0158565 A1    Aug. 12, 2004

(30) Foreign Application Priority Data

Jan. 31, 2003    (JP) ................ 2003-024974

(51) Int. Cl.
 G06F 15/16    (2006.01)
 G06F 7/00    (2006.01)
(52) U.S. Cl. .......... 709/227; 707/603; 707/748
(58) Field of Classification Search ........ 709/227; 707/603, 748
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,442,549 B1 * | 8/2002 | Schneider | 707/10 |
| 6,631,522 B1 * | 10/2003 | Erdelyi | 725/53 |
| 6,842,604 B1 * | 1/2005 | Cook et al. | 455/3.06 |
| 6,980,977 B2 * | 12/2005 | Hoshi et al. | 707/1 |
| 7,158,805 B1 * | 1/2007 | Park et al. | 455/519 |
| 7,203,760 B2 * | 4/2007 | Shimada | 709/235 |
| 2002/0029291 A1 * | 3/2002 | Crandall | 709/246 |
| 2002/0087649 A1 * | 7/2002 | Horvitz | 709/207 |
| 2003/0008679 A1 * | 1/2003 | Iwata et al. | 455/556 |
| 2004/0093418 A1 * | 5/2004 | Tuomi | 709/228 |
| 2004/0180669 A1 * | 9/2004 | Kall | 455/456.1 |

FOREIGN PATENT DOCUMENTS

| | | |
|---|---|---|
| JP | 11-136365 | 5/1999 |
| JP | 2001-202318 | 7/2001 |
| JP | 2001-331403 | 11/2001 |
| JP | 2002-189662 | 7/2002 |
| JP | 2002-202927 | 7/2002 |

OTHER PUBLICATIONS

Translation corresponding to paragraphs 0021 to 0059 in Japanese Patent Publication No. 2002-189662.
Japanese Office Action issued Feb. 1, 2011 in corresponding Japanese Patent Application 2008-324670.

* cited by examiner

Primary Examiner — Phuoc Nguyen
Assistant Examiner — Mark Fearer
(74) Attorney, Agent, or Firm — Staas & Halsey LLP

(57) ABSTRACT

In an information delivery apparatus and method, when a user who transmits information updates information to be transmitted, based on a profile of each user desiring delivery of the information, the order of delivering the updated information, that is, from which user the updated information should be sequentially delivered, is determined beforehand, and information delivery matching a status of the user at a delivered end.

11 Claims, 41 Drawing Sheets

| INDEX | USER ID | USER NAME | PASSWORD | TELEPHONE NUMBER | e-MAIL ADDRESS | SUBSCRIBING USER INDICES |
|---|---|---|---|---|---|---|
| 0 | ticket | checket | abcde | XXX | △△△ | |
| 1 | yamada | yamada tarou | fghij | ■■■ | ○○○ | 0, 2, 41, 96 |
| 2 | suzuki | suzuki ichirou | lmnop | ◇◇◇ | ▽▽▽ | 0, 1, 20 |
| 3 | tanaka | tanaka jirou | qrstu | □□□ | ●●● | 0, 11 |
| 4 | satou | satou saburo | vwxyz | ◆◆◆ | ◎◎◎ | |

FIG. 10

| USER ID | ticket | information: STAR PEACE TICKETS WILL BE ON SALE TOMORROW AT 10:00. | | | | | | | |
|---|---|---|---|---|---|---|---|---|---|
| SUBSCRIBING USER ID | FREQUENCY OF UPDATING | LAST DATE OF UPDATING | THE NUMBER OF TELEPHONE CALLS | THE NUMBER OF e-MAIL POSTINGS | TYPE OF TERMINAL | PRESENT LOCATION | PRESENCE | PRIORIRY HISTORY |
| yamada | 11 | 2002/7/10 | 0 | 0 | MO | 135,41 | out of area | 1,2,10,15,1 |
| suzuki | 3 | 2002/7/11 | 0 | 0 | MO | 134,39 | empty | 2,1,5,7,6 |
| tanaka | 10 | 2002/7/12 | 0 | 0 | PC |  | on line | 3,3,1,2,5 |
| satou | 6 | 2002/7/03 | 0 | 0 | PC |  | off line | 4,61,70,75,112 |

FIG. 11A

| USER ID | yamada | information: I WILL BE ABSENT TOMORROW. | | | | | | | |
|---|---|---|---|---|---|---|---|---|---|
| SUBSCRIBING USER ID | FREQUENCY OF UPDATING | LAST DATE OF UPDATING | THE NUMBER OF TELEPHONE CALLS | THE NUMBER OF e-MAIL POSTINGS | TYPE OF TERMINAL | PRESENT LOCATION | PRESENCE | PRIORIRY HISTORY |
| suzuki | 3 | 2002/7/11 | 3 | 2 | MO | 134,39 | empty | 1,1,2,1,1 |
| tanaka | 10 | 2002/7/12 | 5 | 0 | PC | | on line | 2,3,3,2,2 |

FIG. 11B

| USER ID | suzuki | information: I WILL TAKE AN OFFICIAL TRIP FROM JULY 25. | | | | | | |
|---|---|---|---|---|---|---|---|---|
| SUBSCRIBING USER ID | FREQUENCY OF UPDATING | LAST DATE OF UPDATING | THE NUMBER OF TELEPHONE CALLS | THE NUMBER OF e-MAIL POSTINGS | TYPE OF TERMINAL | PRESENT LOCATION | PRESENCE | PRIORIRY HISTORY |
| yamada | 11 | 2002/7/10 | 12 | 14 | MO | 135,41 | out of area | 1,1,2,1,1 |
| tanaka | 10 | 2002/7/12 | 5 | 2 | PC | | on line | 2,2,1,1,2 |

FIG. 11C

APPARATUS FOR DELIVERING INFORMATION AND METHOD THEREFOR

BACKGROUND OF THE INVENTION

1. Field of the Invention

The present invention relates to information delivery apparatuses and methods that deliver information to users by using communication lines, and in particular, to an apparatus and method in which, when information is delivered to a user by a network such as the Internet, a delay occurring until the delivered information reaches the user is reduced.

2. Description of the Related Art

In recent years, various types of information have become available by using networks such as the Internet. The use of the Internet enables inexpensive communication compared with communication using subscriber lines. Accordingly, the Internet is used to deliver, to users, direct e-mail messages which have been conventionally sent by postal mail.

In information deliver using the Internet, delivered information is not limited to only text information, but large-amount information, such as images, is transmitted in large volume. Thus, on the Internet, which is constituted by connecting various networks, there is a high possibility that a delay in information delivery may occur.

An avoiding method for avoiding the delay in information delivery (e.g., Japanese Unexamined Patent Application Publication No. 2001-202318, the "Description of the Related Art" section, and page 3) is known in which information transmitting servers are distributed and a transmission path between each server and each user is shortened, or a particular server is prevented from having a concentrated load to avoid a delay information delivery.

Also, an invention which sends advertisement information to user with appropriate timing, such as delivery of guidance of a lunch menu to users before a lunch hour, has been disclosed (e.g., Japanese Unexamined Patent Application Publication No. 2002-189662, pp. 3 to 4)

Moreover, an information delivery system is known in which a menu of information whose deliver is desired by each user and desired timing (such as each time of updating content, a fixed time of everyday, or a time on or before a designated time) for the information delivery are selectively registered and the information is delivered with the registered desired timing. This information delivery system also has a disclosure (e.g., Japanese Unexamined Patent Application Publication No. 11-136365, paragraph numbers 0017, 0018, and 0033) indicating that, based on load information predicting a load per hour of a communication network for delivering the information, and the desired timing for delivery, the desired information is delivered in a time zone which satisfies the desired timing and which has the minimum load on the communication network.

With the method disclosed in Japanese Unexamined Patent Application Publication No. 2001-202318, and with extensive advances in technology, such as an increased transmission speed on a transmission path, an increased compression factor of information itself to be transmitted/received, and advances in signal processing technology, a delay in information delivery is reduced. However, it is highly expected that, by using the information delivery systems disclosed in Japanese Unexamined Patent Application Publication Nos. 2002-189662 and 11-136365, an increasing number of users transmit information and amounts of information flowing on the network remarkably increase. Thus, improvements in various types of hardware are essential to avoid a delay in information delivery, but it is expected that it is difficult for only the improvements in the hardware to solve the delay in information delivery.

Accordingly, it is anticipated that also an information delivery method, such as information delivery based on a time that a user desires delivery or timing, as in Japanese Unexamined Patent Application Publication No. 2002-189662 or 11-136365, is a solution to avoidance of a delay in delivery.

As in Japanese Unexamined Patent Application Publication No. 2002-189662, a time designating method is effective when there is enough time from transmission of information to arrival of the information at a user since the information can be delivered on or before a designated time. However, it may not be said that the time designating method is not suitable for information delivery which requires instancy.

Also, in the invention described in Japanese Unexamined Patent Application Publication No. 11-136365, a user designates the priorities of pieces of desired information, and sets desired timing for delivery to "each time of updating content", whereby, in accordance with the descending order in priority of the pieces of information, a piece of information is delivered to the user each time the piece of information is updated. In this invention, when many users assign high priority to the same piece of information and sets desired timing for delivery to "each time of updating content", large amounts of information are delivered at a time. In this case, depending on the status of a network, just after updating of content, the updated content cannot reach even users who have set the desired timing for delivery to "each time of updating content", thus causing a delay in information reception. Also, even if users are divided into free-membership users and paid-membership users and information is distributed to the paid-membership users with higher priority, the more the number of the paid-membership users is, the higher the load on the network will be, thus causing delays in information delivery.

SUMMARY OF THE INVENTION

In an information delivery method of the related art, information is delivered with delivery timing such as a delivery time set by a user who desires delivery, or the time that information is updated. Accordingly, when there are a large number of users who set the same delivering information to be delivered, a remarkable delay occurs in information delivery. The users do not always refer to the delivered information with the set timing, thus causing a problem in that, in such a situation, there is an unused piece of the delivering information.

Specifically, in the case of transmitting/receiving attendance information between users by electronic mail (e-mail), Instant Message Service, or the like, for example, if information representing a online state is delivered without considering delivery order, a problem may occur in that arrival of the online state notification to one user is delayed and when the user makes a telephone call, the state of the transmitter is offline (or absent).

It is an object of the present invention to perform appropriate delivery of desired information by improving the above information delivery methods of the related art.

The present invention is made based on the idea that, to solve the above problem in that there is an unused piece of the delivering information, by determining the order of information delivery to users not only based on delivery timing set by the users, but also based on user statuses, and delivering information, the information can be preferentially delivered to each user who can immediately refer to the delivered information with the desired timing, whereby the user can promptly access the delivered information and information can be exchanged with appropriate timing between information transmitting and receiving users.

According to an aspect of the present invention, an information delivery apparatus for delivering information to a plurality of user terminals is provided. The information delivery apparatus includes a user entry for storing identification information for identifying each of the user terminals and an index for designating delivering information to be delivered to the user terminals so that the delivering information corresponds to the identification information, a watcher user entry for storing the delivering information designated by the index and profiles transmitted from the user terminals so that the profiles correspond to pieces of the identification information of the user terminals, and a processing unit which, when the delivering information is updated, based on the profiles, determines the order of delivering the updated delivering information to the user terminals.

Preferably, each of the profiles includes at least one of information which is transmitted from each user terminal and which represents the present status of the user terminal, terminal-type information of the user terminal, positional information of the user terminal, the priority of the user terminal used in delivery of information in the past, a communication history, the number of times information transmitted from the user terminal is updated, the last time of the updating, and charge/free-of-charge information indicating whether a value for the delivering information is paid.

Since the order of delivering information is determined based on profiles, the information can be delivered in order matching user terminals to which the information is delivered, and the statuses of users.

The delivering information stored in the watcher user entry may be formed by pieces of delivering information to be delivered, and the pieces of delivering information may differ depending on delivery order.

The above configuration of the information delivery apparatus enables delivery of different pieces of information in accordance with user terminals or users.

The delivering information may include information defining a range of the validity of the delivering information, and based on the information defining the range of the validity of the delivering information, the processing unit may determine whether or not delivery of the delivering information is permitted and the order of delivering the delivering information to the user terminals.

The range of the validity may define a date and time of delivering the delivering information.

The delivering information may be delivered to the user terminals in a form in which the delivery order is included in the delivering information.

The information delivery apparatus may perform receiving the delivery order of the delivering information and change information for changing the content of the delivering information in accordance with the delivery order of the delivering information, changing the delivering information by using the change information, and delivering the changed information in the received delivery order.

According to another aspect of the present invention, an information delivery method for delivering information to a plurality of user terminals is provided. The information delivery method includes the steps of: acquiring delivering information from the user terminals; acquiring identification information of each user terminal which directs delivery of the delivering information, and an index of each piece of the delivering information; acquiring profiles from the user terminals, which directs delivery of the delivering information; storing, for each index, the identification information of each user terminal, which directs delivery of the delivering information, and the profiles from the user terminals; and, when the delivering information is updated, based on the profiles, determining the order of deliver to the user terminals which direct delivery of the delivering information.

The above formation of the information delivery method enables delivery of different pieces of information in accordance with user terminals or users.

Preferably, in the information delivery method, each of the profiles includes at least one of information which is transmitted from each user terminal and which represents the present status of the user terminal, terminal-type information of the user terminal, positional information of the user terminal, the priority of the user terminal used in delivery of information in the past, a communication history, the number of times information transmitted from the user terminal is updated, the last update time, and charge/free-of-charge information indicating whether a value for the delivering information is paid.

According to the present invention, in delivery of information to a plurality of user terminals, identification information of each user terminal desiring delivery of the information, and information representing a dynamic status of the user terminal or its user are stored so that both corresponds to each other, and based on the information stored, the order of delivering the information is determined. Thus, this enables appropriate delivery of information in order based on a user terminal's status.

BRIEF DESCRIPTION OF THE DRAWINGS

FIG. 10 is an illustration of an outline of a user entry;

FIGS. 11A, 11B, and 11C are illustrations of watcher user entries;

DESCRIPTION OF THE PREFERRED EMBODIMENTS

In the present invention, both an information transmitter and an information receiver are collectively called "users". To distinguish between both users, the information transmitting user is called the "information providing user (provider)", and the information receiving user is called the "subscribing user (watcher)".

First Embodiment

Figure 1:
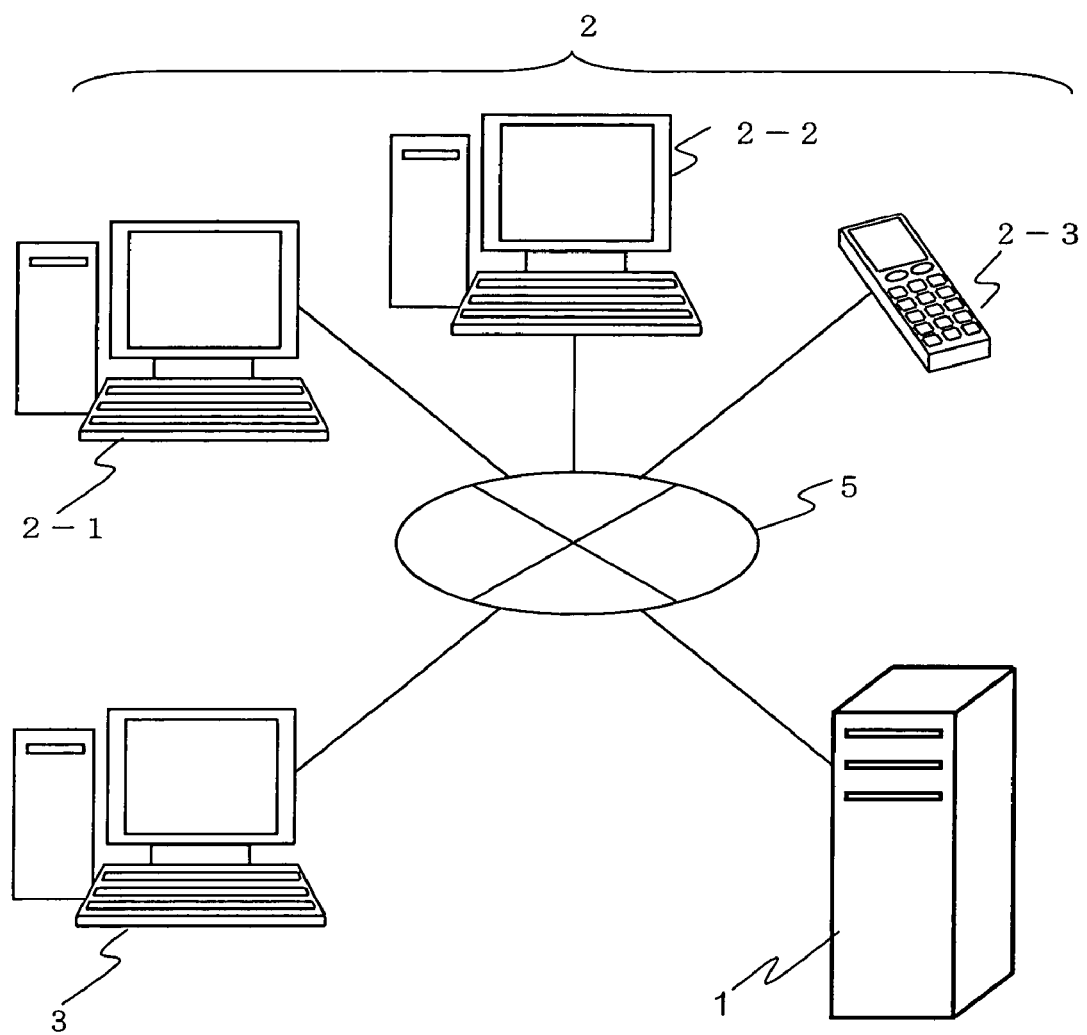
FIG. 1 is a block diagram showing an information delivery system to which the present invention is applied.

An example of an information delivery system to which an information delivery apparatus 1 according to a first embodiment of the present invention is applied is described with reference to FIG. 1. The information delivery apparatus 1 is connected to a plurality of user clients 2 and a store client 3 through a network 5 such as the Internet. FIG. 1 shows user clients 2-1 and 2-2 in which personal computers (PCs) are used as user terminals, and a user client 2-3 in which a mobile phone is used as a user terminal. In addition, a personal digital assistant (PDA) or the like may be used as a user terminal.

Each of the user clients 2-1 and 2-2 uses client software installed in the PC to use a service provided by the information delivery apparatus 1. The user client 2-3 uses a web browser installed in the mobile phone to use the service provided by the information delivery apparatus 1. Also each of the user clients 2-1 and 2-2 can have a web browser installed thereon, and the mobile phone can use the service by using client software in a program environment such as Java.

Although the user clients 2-1 and 2-2 and the store client 3 have no functional difference, both are distinguished from each other in order to simplify the following description.

Figure 2:
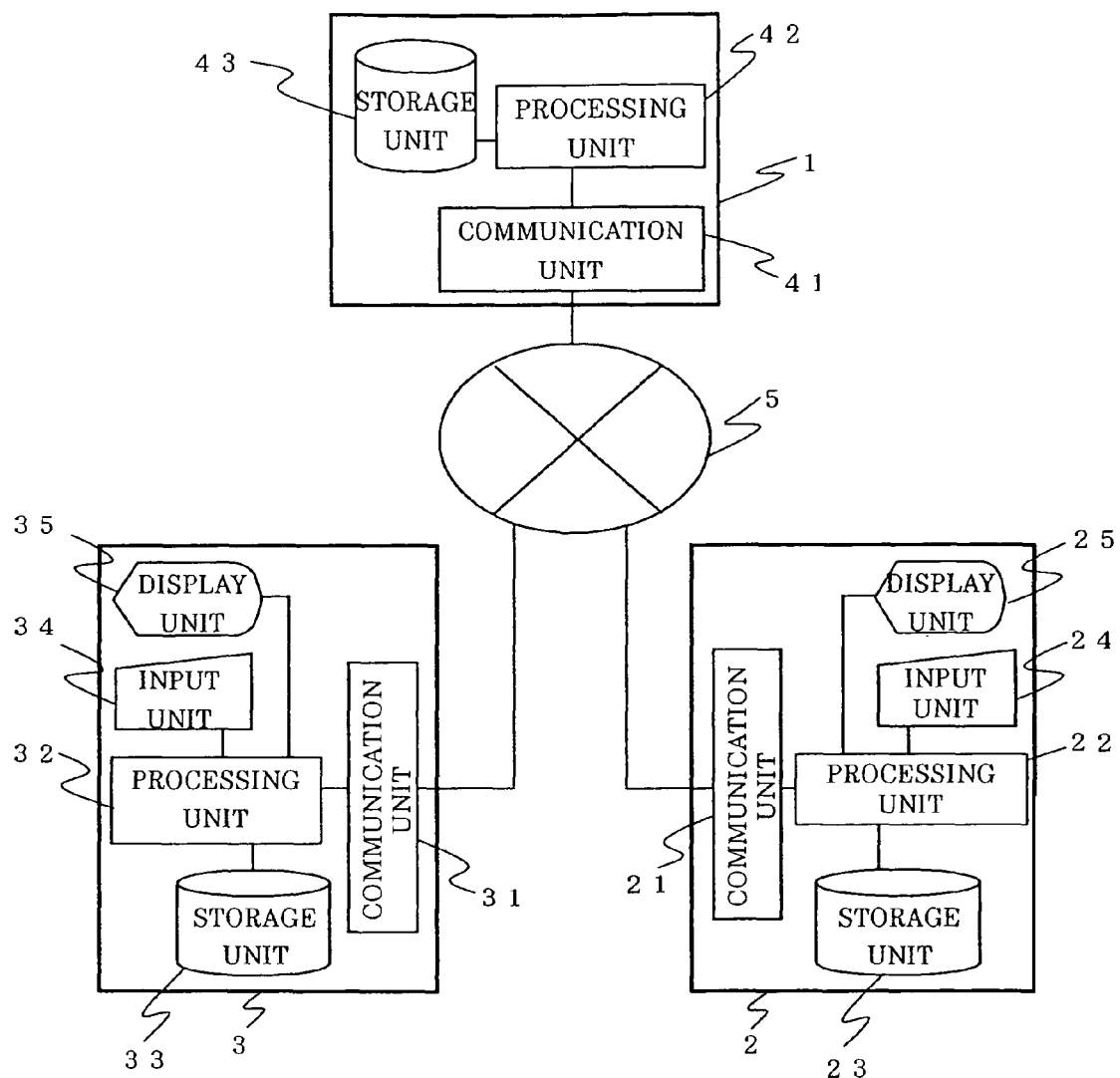
FIG. 2 is a detailed block diagram showing the information delivery system shown in FIG. 1.

Next, the outline of the information delivery apparatus 1 is described below with reference to FIG. 2 showing the details of the information delivery system. For brevity of description, FIG. 2 shows the information delivery system in a form in which one user client 2 and the store client 3 are connected to the information delivery apparatus 1 through the network 5. Obviously, there are actually a plurality of user clients 2 and store clients 3 and they are connected when the present invention is practiced. The information delivery apparatus 1 is connected to each client through the network 5 and a communication unit 41, and transmits/receives information to/from each client. The communication unit 41 is connected to a processing unit 42. The processing unit 42 uses a server program to control a storage unit 43 to store information set/provided by the user client 2 and the store client 3. The processing unit 42 may be configured so that input devices, such as a keyboard and a mouse, and a display device for displaying the status and result of processing can be connected to the processing unit 42.

This embodiment shows a case in which the user client 2 and the store client 3 are identical in configuration. The user client 2 is connected to the network 5 by a communication unit 21. The communication unit 21 is connected to a processing unit 22. The processing unit 22 is connected to a storage unit 23 for storing various types of data and programs, an input unit 24 such as a keyboard or a mouse, and a display unit 25 for displaying an input from the input unit 24, delivered information, etc. The store client 3 similarly includes a communication unit 31, a processing unit 32, a storage unit 33, an input unit 34, and a display unit 35.

Figure 3:
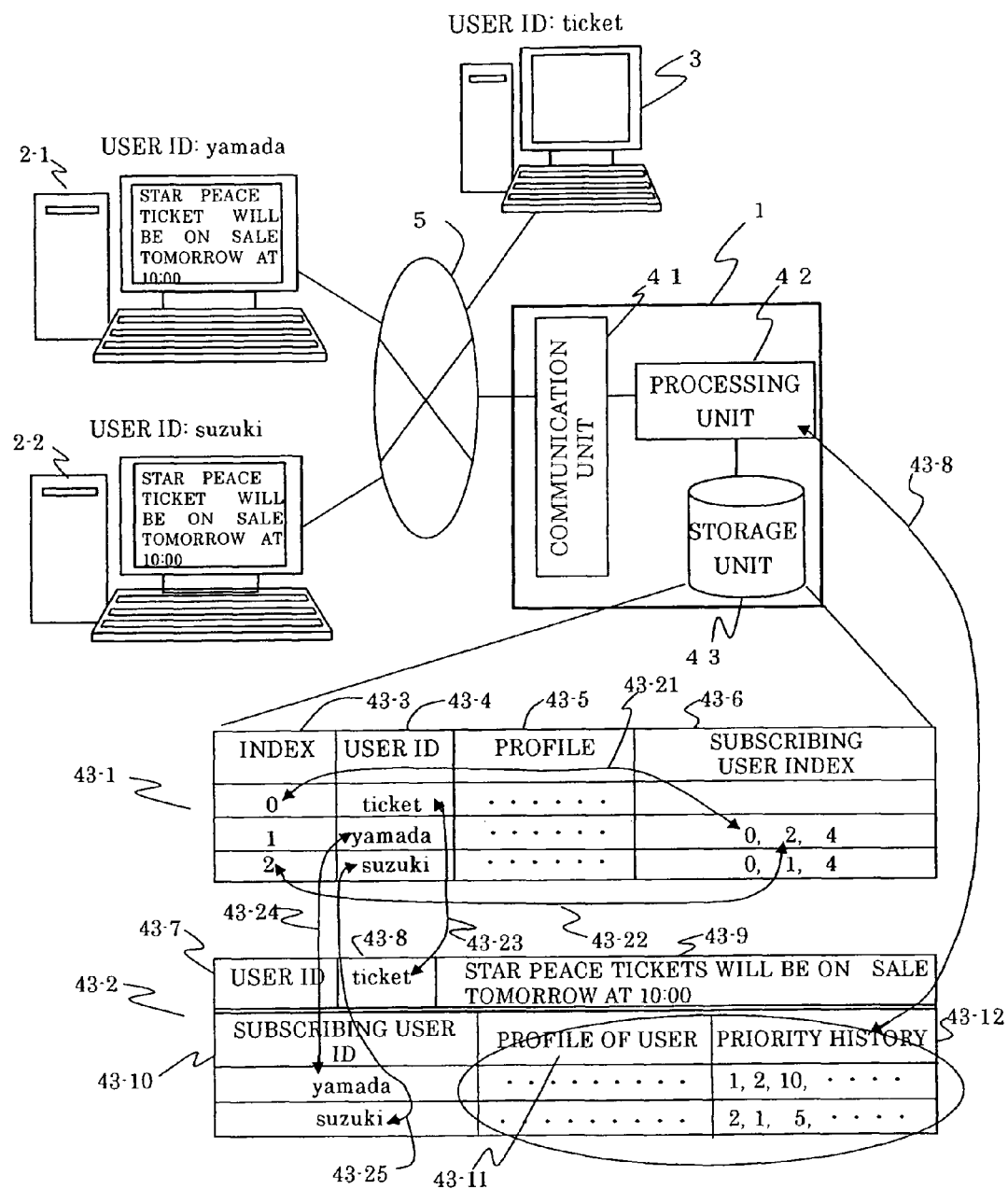
FIG. 3 is an illustration of an outline of the present invention.

Next, the basic operation of the present invention is described below with reference to FIG. 3 showing the outline of operation of the present invention.

The user ID of the user client 2-1 is set to be "yamada", and the user ID of the user client 2-2 is set to be "suzuki". In FIG. 3, information is provided from the store client 3 of which the user ID is "ticket". A method of determining delivery order in the case of delivering the information provided by the store client 3 to the clients 2-1 and 2-2 is described below.

The user clients 2-1 and 2-2, and the store client 3 (FIG. 1), which use the information delivery apparatus 1, register with the information delivery apparatus 1 beforehand. Referring to FIG. 3, when the store client 3, and the user clients 2-1 and 2-2 are registered with the information delivery apparatus 1 in the order given, data indicated by a user entry 43-1 is stored in the storage unit 43 in the information delivery apparatus 1 in FIG. 3. In FIG. 3, tables 43-1 and 43-2 schematically indicate groups of data which are stored in the storage unit 43. Arrows such as 43-24, 43-25 show corresponding items each other. The user entry 43-1 stores, for each index, settings from users and information given in setting modes. Specifically, the user entry 43-1 stores, for each index, a user ID shown USER ID section 43-4, a user name, a password, a user's profile (described later), a subscribing user index shown in subscribing user section 43-6 representing the indices of information-transmitting users from which the user desires information delivery, etc. In this context, the word "subscription" of the subscribing user index does not always mean charging.

The user entry 43-1 in FIG. 3 stores, for the index "0", information concerning the store client 3. In the user ID section 43-4, the user ID "ticket" of the store client 3 is stored. In the profile section 43-5, various types of information of the store client 3 are stored. Since the store client 3 has no information-transmitting user from which it desires information delivery, no index is stored in the subscribing user index section 43-6.

For the index "1", information concerning the user client 2-1 is stored. In the user ID section 43-4, the user ID "yamada" of the user client 2-1 is stored. In the profile section 43-5, various types of information of the user client 2-1 are stored. Since the user client 2-1 desires information deliveries from users indicated by the indices "0", "2", and "4", the indices "0", "2", and "4" are stored in the subscribing user index section 43-6. Also, for the index "2", the user ID, profile, and subscribing user index of the user client 2-2 are stored.

The subscribing user indices of the user client 2-1, indicated by the index "1", are "0, 2, 4", and the subscribing user indices of the user client 2-2, indicated by the index "2", are "0, 1, 4". Thus, as shown in FIG. 3, information from the store client 3 corresponding to the index "0" is delivered (see 43-21 in FIG. 3 indicating correspondence) to the user client 2-1, information from the user client 2-2 corresponding to the index "2" is delivered (see 43-22 in FIG. 3) to the user client 2-1, and information from a user client (not shown) corresponding to the index "4" is delivered to the user client 2-1.

Also, as shown in FIG. 3, information from the store client 3 corresponding to the index "0", information from the user client 2-1 corresponding to the index "1", and information from the user client (not shown) corresponding to the index "4" are delivered to the user client 2-2 corresponding to the index "2".

Next, a watcher user entry 43-2 is described below, with the store client 3 as an example.

The watcher user entry 43-2 stores a piece of information which represents "STAR PEACE TICKETS WILL BE ON SALE TOMORROW AT 10:00" (see 43-9 in FIG. 3) so that the piece of information corresponds to the user ID "ticket" of the store client 3. Information that a user provides can be set as providing information if the information that the user provides is information that the user can disclose, such as user-status information stored in the user entry 43-1.

Each of the user clients 2-1 and 2-2 identified by the indices "1" and "2" has the index "0" (of the store client 3) registered in the subscribing user index. Accordingly, in the subscribing user ID section 43-10 of the watcher user entry 43-2, the user ID "yamada" corresponding to the index "1" (see 43-24) and the user ID "suzuki" corresponding to the index "2" (see 43-25) are registered. For each subscribing user ID, the profile of the user (in a profile of the user section 43-11), and a priority history (in a priority history section 43-12) representing an delivery-order history in a case in which information from the store client 3 was delivered in the past.

It is assumed that the store client 3 changes its providing information to the information "STAR PEACE TICKETS WILL BE ON SALE TOMORROW AT 10:00" (see 43-9 in FIG. 3). The updated information is posted from the store client 3 to the information delivery apparatus 1 through the network 5 and the communication unit 41. The processing unit 42 in the information delivery apparatus 1 changes the content of the watcher-user-entry-information section 43-9 of the store client 3 to the posted information. By using this change as a trigger, the updated information is delivered to each user registered as the subscribing user in the watcher user entry.

When delivering the information, the processing unit 42 determines information-delivering order by referring to the profile and priority history of each user.

Also, since, in the user entry 43-1, in the subscribing-desiring-user index section 43-6 for the user corresponding to the index "1", the indices "0, 2, 4" are stored, and in the subscribing-desiring-user index section 43-6 for the user corresponding to the index "2", the indices "0, 1, 4" are stored, each user receives information delivered from the store client 3, and both set information delivery from each other. Thus, when one user transmits e-mail, the information section, such as profile of user 43-11 and/or priority history 43-12, of the watcher user entry 43-2 of the one user is rewritten, and the rewritten information is delivered to the other user. In other words, the present invention has not only a use in which, as in the store client 3, an enterprise, a group, etc., deliver information such as product data, news, and stock prices, but also a function for use in information exchange between individuals.

In this embodiment, when the delivering information provided by the store client 3 is updated, information can be delivered to the user clients 2-1 and 2-2 as the subscribing users. A delivery program of the information delivery apparatus 1 for providing this service retains various types of information concerning each user client. Posting to each user client can be performed not only by real-time posting using persistent connection of TCP/IP (Transmission Control Protocol/Internet Protocol), but also by pseudo real-time posting using e-mail.

Figure 4A:
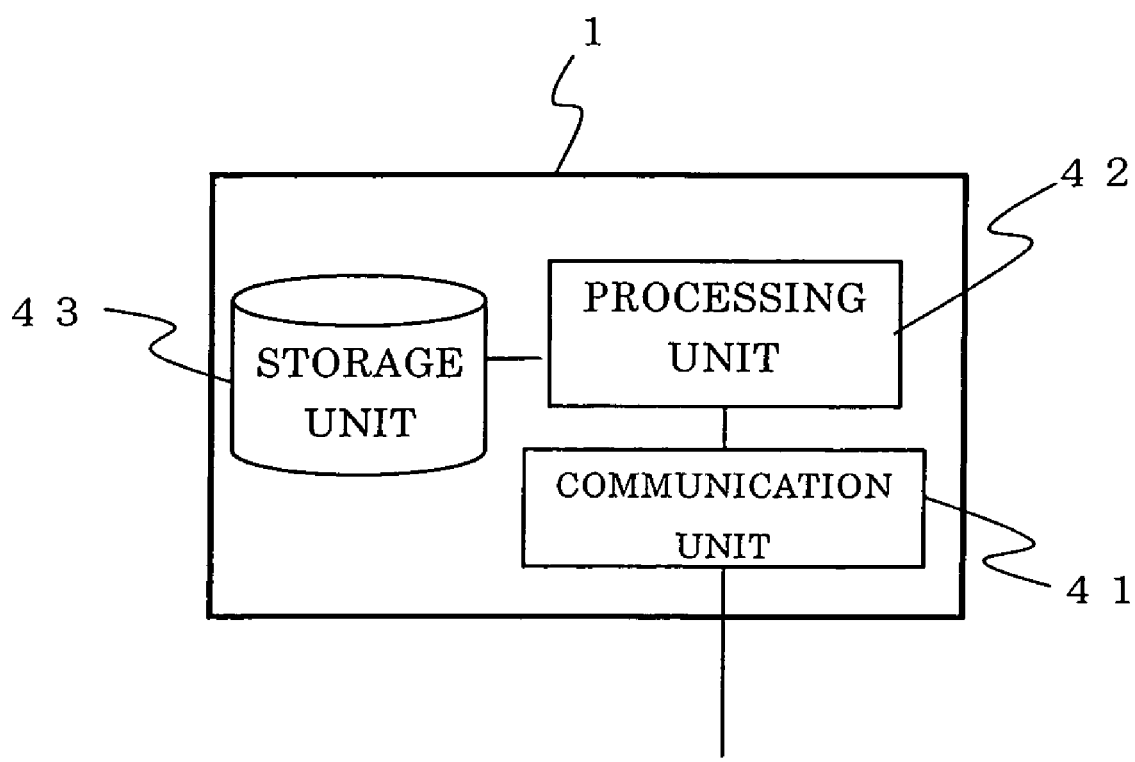
FIGS. 4A, 4B, and 4C are block diagrams showing basic configurations of an information delivery apparatus.
Figure 4B:
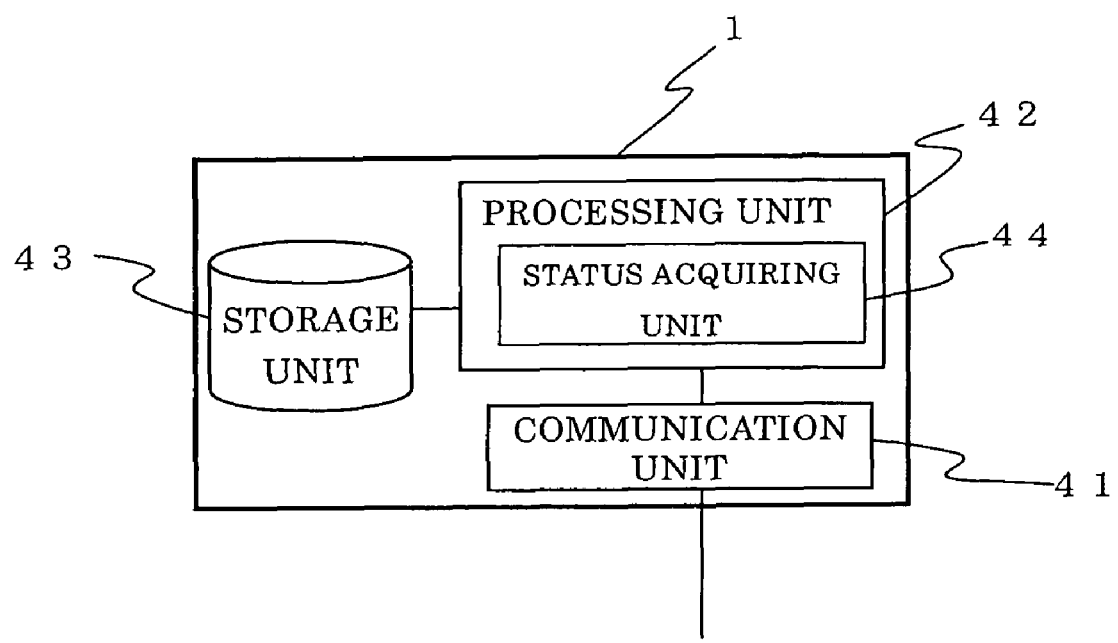
Figure 4C:
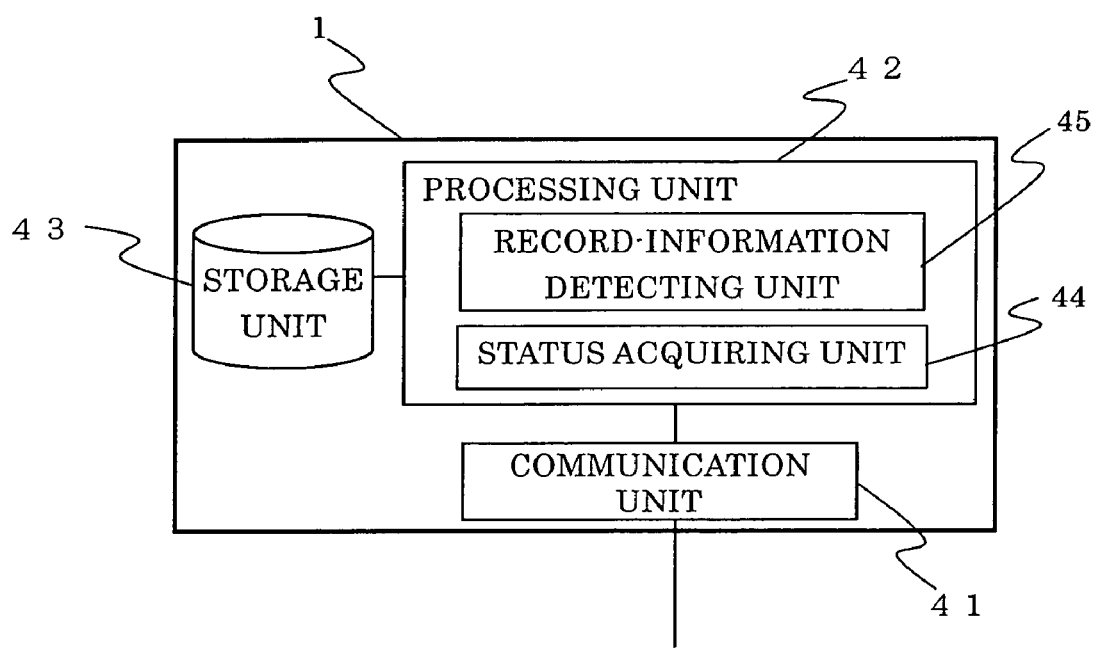

Basic configurations of the information delivery apparatus 1, which has been described, are shown in FIGS. 4A, 4B, and 4C. FIG. 4A shows an example in which the information delivery apparatus 1 includes a communication unit 41, a processing unit 42, and a storage unit 43. When this example of the information delivery apparatus 1 receives designation of a subscribing user from the subscribing-user client 2 or 3, the processing unit 42 registers or updates an index corresponding to the designated subscribing user in the subscribing user index section 43-6 of the user entry 43-1 of a subscribing user client. The processing unit 42 determines whether the information updated by the information-providing user client 2 or 3, which is an information transmitter, is delivered to the subscribing user client 2 or 3, which is an information delivery destination. The information updated by the information-providing user client 2 or 3 is stored in the storage unit 43 with information concerning information updating such as a frequency of information updating by the information-providing user client 2 or 3, and a last updating date and time. Also, the processing unit 42 determines deliver order (priorities) from the subscribing user client 2 or 3, to which information should be delivered from a subscribing user index and which is stored in association with the information-providing user client 2, which updates information, and from information (an updating frequency, a last updating date and time, etc.) concerning information updating of the subscribing user client 2 or 3, to which information should be delivered. The updated information is delivered to the user client 2 or 3 in the determined delivery order.

In an example of the information delivery apparatus 1 in FIG. 4B, a processing unit 42 includes a status acquiring unit 44. The status acquiring unit 44 acquires information concerning the user of the user client 2, a user terminal, or the like, and the acquired information is stored in a storage unit 43. The example of the information delivery apparatus 1 in FIG. 4B determines delivery order in the case of delivering information to the user client 2 also by considering the acquired information. The status acquiring unit 44 may has a communication function based on persistent connection, and may perform status acquisition such as the ON/OFF state and position of the user client 2.

In an example of the information delivery apparatus 1 in FIG. 4C, a processing unit 42 includes a status acquiring unit 44 and a record-information detecting unit 45. A direct operation of a user or an event resulted from a user's operation is acquired by the record-information detecting unit 45 and is stored in a storage unit 43 with an updating frequency and last updating date and time of a user client 2 so as to be used for determining information delivery order. Any one of the examples of the information delivery apparatus 1 may be used. Moreover, an example of the information delivery apparatus 1 which has another function may be used.

The above-described outline of the present invention is further described below.

Figure 5:
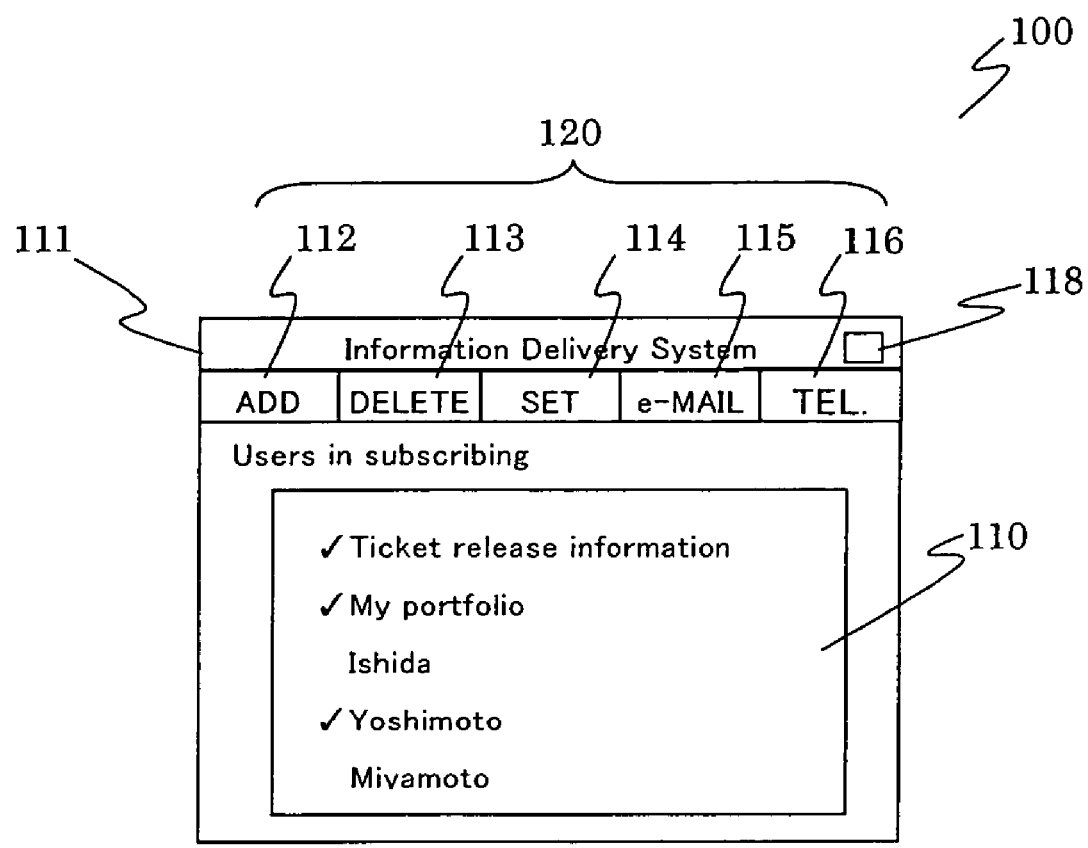
FIG. 5 is an illustration of an example of a client software screen shot.

Outlines of the user clients 2 and 3 are described. Each of the user clients 2 and 3 has functions in which its user registers and updates configurable information, in which, when information of the other user client is changed, the information can be delivered, and which displays delivered information on a screen. FIG. 5 shows an example of a screen shot 100 of the user client 2. Although the example of the screen in FIG. 5 is a client screen for a PC (personal computer), a screen in a client or browser for a mobile phone also realizes a display level equivalent to that in the client screen for the PC. FIG. 5 shows a state in which client software is activated. When being activated, the client software in this embodiment performs authentication and establishes a connection to the information delivery apparatus 1.

On a window of the client software, a title 111 in which "Information Delivery System" is displayed, a menu part 120 and a subscribing user list (also known as "buddy list") part 110 are displayed. Although the menu part 112-116 in FIG. 5 contains the items "ADD" 112, "DELETE" 113, "SET" 114, "e-MAIL" 115, and "TEL" 116, it may include other items of various functional types.

Figure 6:
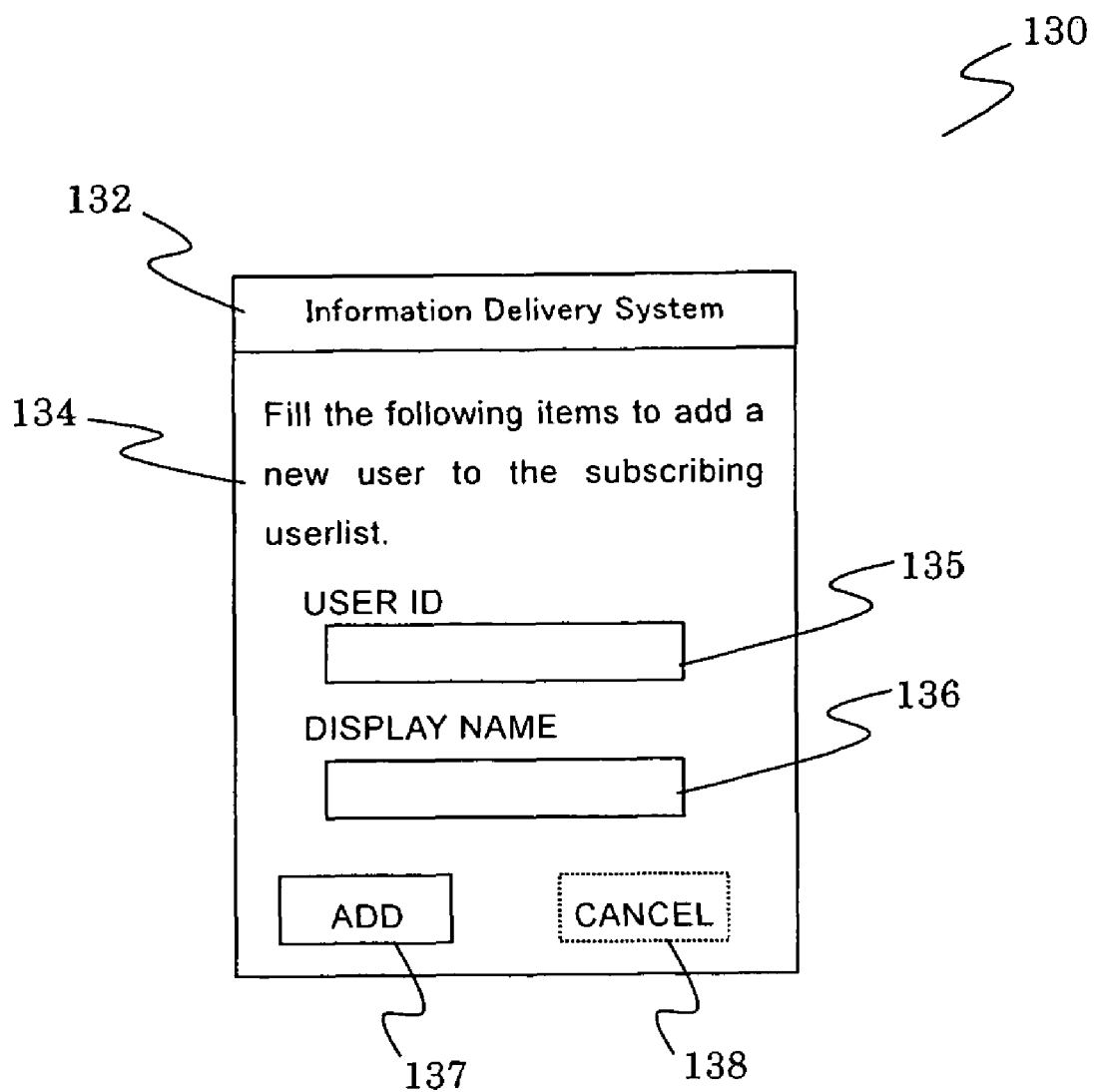
FIG. 6 is an illustration of an example of a user adding screen shot.
Figure 7:
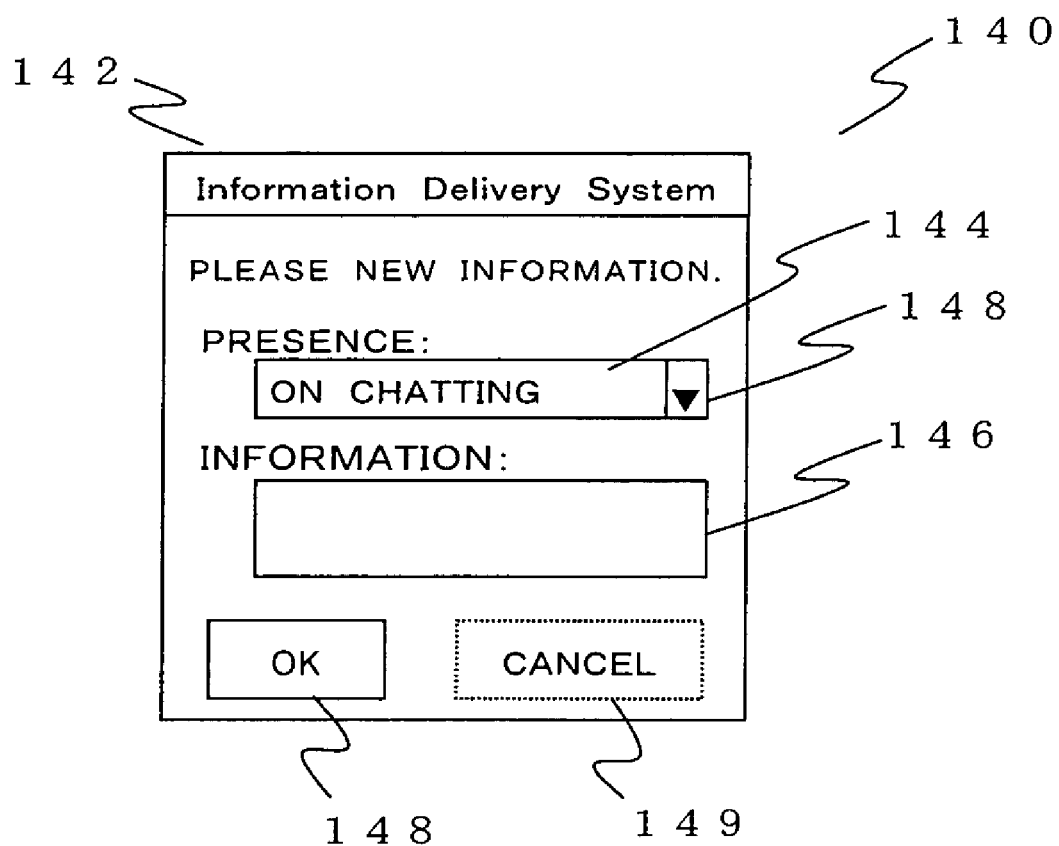
FIG. 7 is an illustration of an example of an information setup screen shot.
Figure 8:
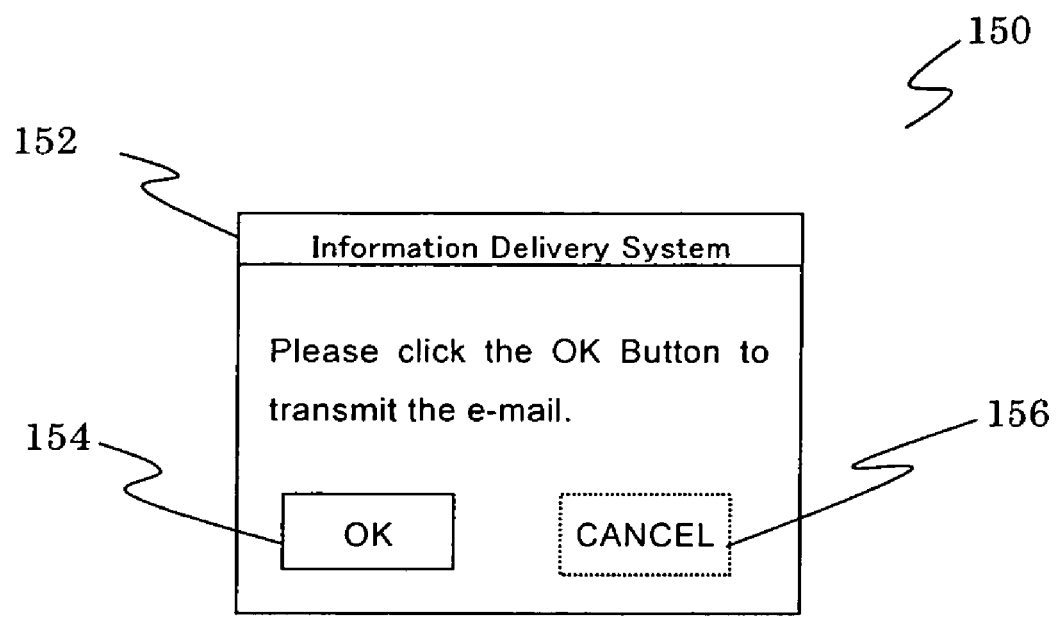
FIG. 8 is an illustration of an example of a communication confirmation screen shot.

The "ADD" item 112 of the menu part 120 is used to add a new user to a subscribing user list 110 which is a list of information-transmitting users, as shown "TICKET release information, My portfolio, Ishida, so on ", from which each of the user clients 2 and 3 desires information delivery. The "DELETE" 113 of the menu part 120 is used to delete a user on the subscribing user list 110. The "SET" 114 item of the menu part 120 is used to set information of a user utilizing the user client 2 or 3. The "e-MAIL" item 115 of the menu part 120 can be used when, from among users whose list is displayed on the subscribing user list 110, at least one user is selected and is used to transmit e-mail to the selected user. The "TEL" item 116 of the menu part 120 can be used when, from among users whose list is displayed on the subscribing user list 110, at least one user is selected and is used to make a telephone call to the selected user. Also, clicking on the close box 118 displayed on the menu part 120 terminates the client software after disconnecting the connection to the information delivery apparatus 1 as a server. FIG. 6 shows a user adding screen 130 for adding a user to the subscribing user list. FIG. 7 shows a screen 140 for configuring presence and information concerning users of the user clients 2 and 3. FIG. 8 shows a communication-confirming screen 150 for transmitting e-mail or making a telephone call to user clients shown on the subscribing user list.

To add a user to the subscribing user list, that is, to establish setting for adding an information-transmitting user from which information is delivered to a terminal on an information-delivered side, in the menu part 110 shown in FIG. 5, the "ADD" item 112 is selected. Selection of the "ADD" item 112 displays the subscribing-user adding screen 130 shown in FIG. 6. By entering a user ID on the USER ID item 135 to be added and a display name (a name displayed on the subscribing user list in FIG. 5) on a display name item 136 of the user adding screen 130, and pressing the "ADD" button 137, the designated user is added to the subscribing user list 110 in FIG. 5. When no display name is designated, a display name designated in a user registering mode is displayed by the information-transmitting side.

To delete a subscribing user, a user to be deleted is selected on the subscribing user list 110 in FIG. 5, and the "DELETE" item 113 is subsequently selected. Then, a confirmation screen may be displayed without immediately deleting the user.

To set information of the user of the user client, the "SET" item 114 is selected in the menu part in FIG. 5. Selection of the "SET" item 114 displays the information setting screen 140 displayed in FIG. 7. On the screen in FIG. 7, information in which the user desires to set "PRESENCE" can be set. The "PRESENCE" on a presence item 144 indicates the present status of the user, and is used to enter the state of chatting as shown in FIG. 7. Also, one of words representing common states, such as attendance, absence, and going out, can be selected from a pull-down menu 148, but a word can be freely entered by the user. In addition, not using the client program to allow the user to enter information, but, in cooperation with another telephone system or the like, the information delivery apparatus 1 may set information such as "on line" and "out of area". By entering "PRESENCE" or information and clicking on the "OK" button, entered information is set and posted to the information delivery apparatus 1.

To transmit e-mail to a subscribing user, a desired user to whom e-mail is sent is selected on the subscribing user list in the part 110 in FIG. 5, and the "e-mail" item 116 of the menu part 120 is subsequently selected. Then, the confirmation screen 150 shown in FIG. 8 is displayed. By clicking on the "OK" button, a mail sending information is transmitted to the information delivery apparatus 1 before an e-mail sending screen is actually displayed. However, when the selected user does not enter an e-mail address when performing user registration with the information delivery apparatus 1, the mail menu is unable to be used. Also telephone transmission can be performed in a process similar to that for e-mail.

Next, the subscribing user list 110 is described. On the subscribing user list 110 shown in FIG. 5, the user set by selecting the "ADD" item 112 of the menu part 111 is displayed. In addition to ordinary users for e-mail exchange and information exchange, also services provided by enterprises, etc., can be registered on the subscribing user list. For example, in FIG. 5, the items "TICKET RELEASE INFORMATION" and "MY PORTFOLIO" in subscribing user list 110 are services, and the other items such as "ishida", "yoshimoto", and "miyamto" are ordinary users. In this embodiment, when one user, registered on the subscribing user list, changes information, the information can be always posted. Those to which the information is posted in real-time are only designated users. Each undesignated user can retrieve information from the information delivery apparatus 1 when clicking on the user name on the subscribing user list.

Next, steps of the use of an information delivery service provided by the enterprise or the like, as described above, are described in detail with reference to FIG. 12.

Figure 9:
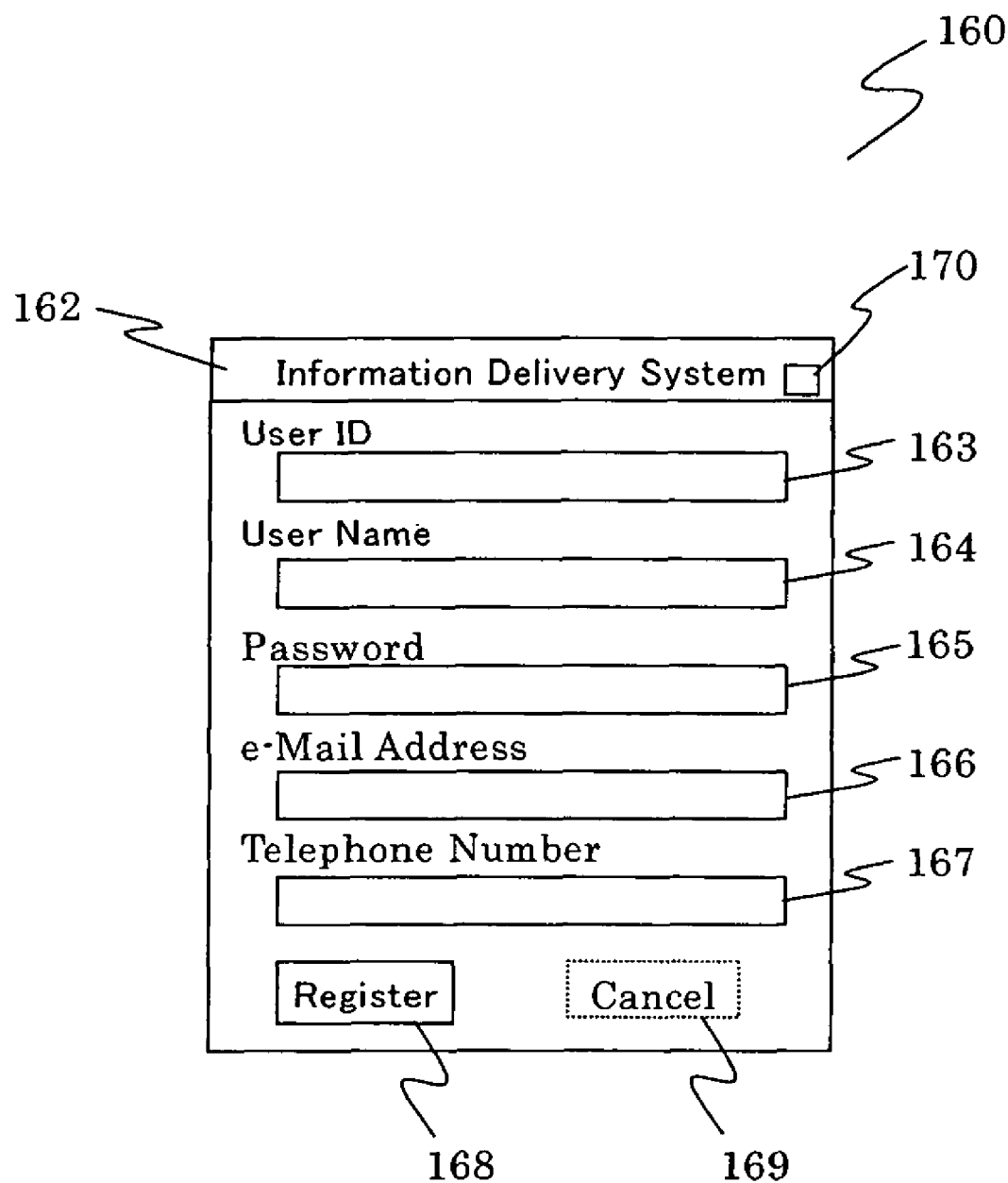
FIG. 9 is an illustration of an example of a user registration screen shot.

To use the service, a user registration screen 160 using the web page shown in FIG. 9 which is provided by the information delivery apparatus 1 is initially displayed (S1200 in FIG. 12) after accessing to a registration page, and the required information, for example User ID 163, and so on as shown in FIG. 9, is entered (S1202 in FIG. 12), whereby user registration is performed. The user registration is configured so that at least a user name, a user ID, and a password are entered. In addition to these pieces of information, an e-mail address, a telephone number, etc., can be entered. The user name is a plain name such as a real name or a service name, and the user ID is a unique character string different from that of another user. The password is used to perform user authentication in a service login mode.

On the web page shown in FIG. 9, by entering a user ID, a user name, a password, and an e-mail address and a telephone number as options, and clicking on the "REGISTER" button 168, which is an OK button (S1204 in FIG. 12), the entered information is transmitted (S1205 in FIG. 12) to a user registering CGI (common gate interface) program operating on the information delivery apparatus 1, and the information delivery apparatus 1 checks about whether the user ID has already existed or not. When the user ID does not exist, a return value representing success for registration is transmitted to the user client 2 (when "YES" in step S1206 in FIG. 12), and a registration completion screen is displayed on a display unit of the user client 2 (step S1208 in FIG. 12). This performs user registration.

Figure 12:
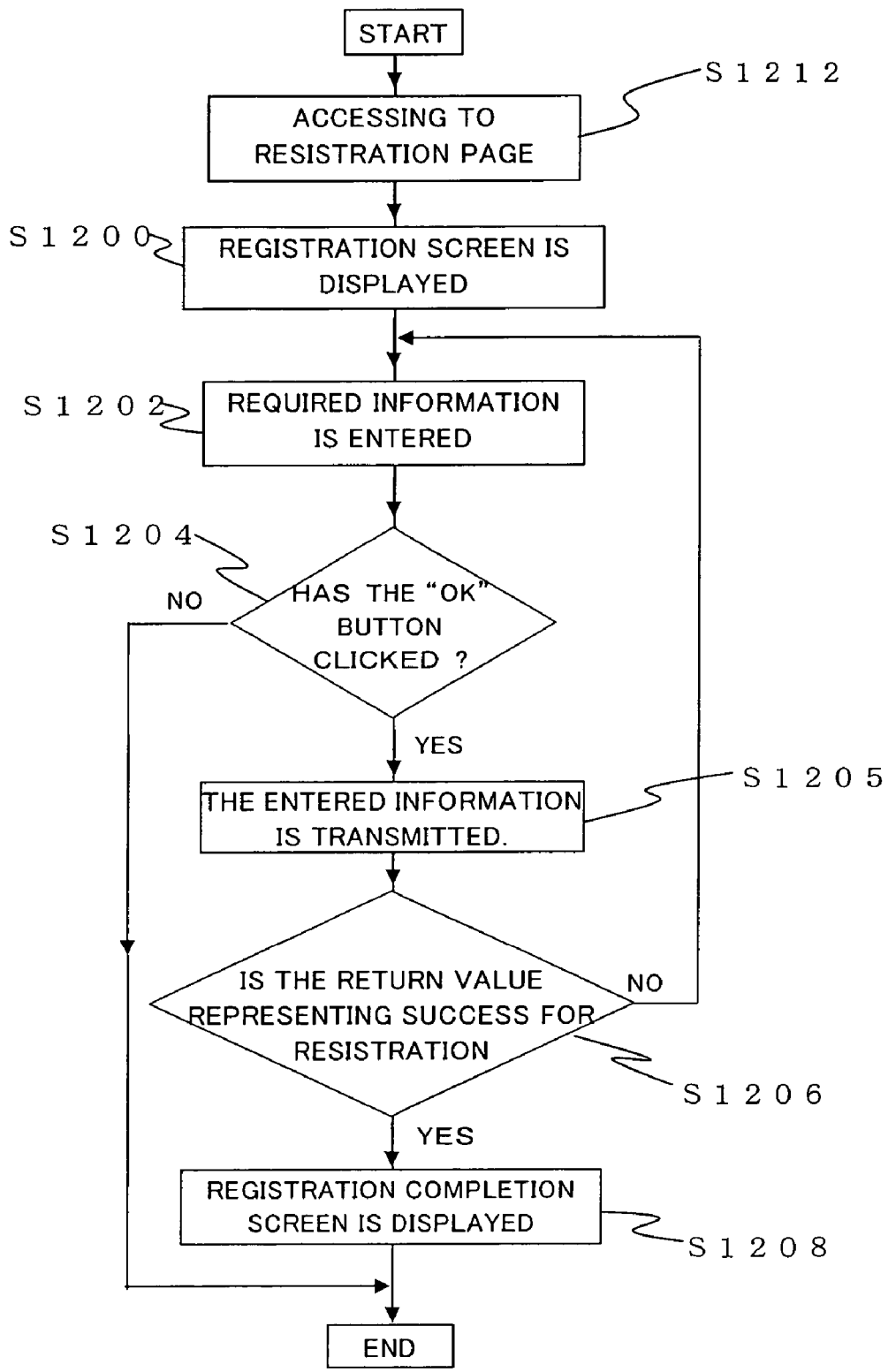
FIG. 12 is a flowchart showing a user registration process.

When the user ID already exists (when "NO" in step S1206 in FIG. 12), the process returns to the registration screen 160 in FIG. 9, and the required information is entered again (S1202 in FIG. 12). Also, by clicking on the "CANCEL" in FIG. 9 button on the registration page after entering the required information (when "NO" in step S1204 in FIG. 12), registration is not performed and the registration process ends.

After the user registration is performed, in a program in the information delivery apparatus 1, two entries for the registered user, that is, a user entry and a watcher user entry, are created. The registration process in the information delivery apparatus 1 is described below with reference to FIGS. 10 and 13.

Figure 13:
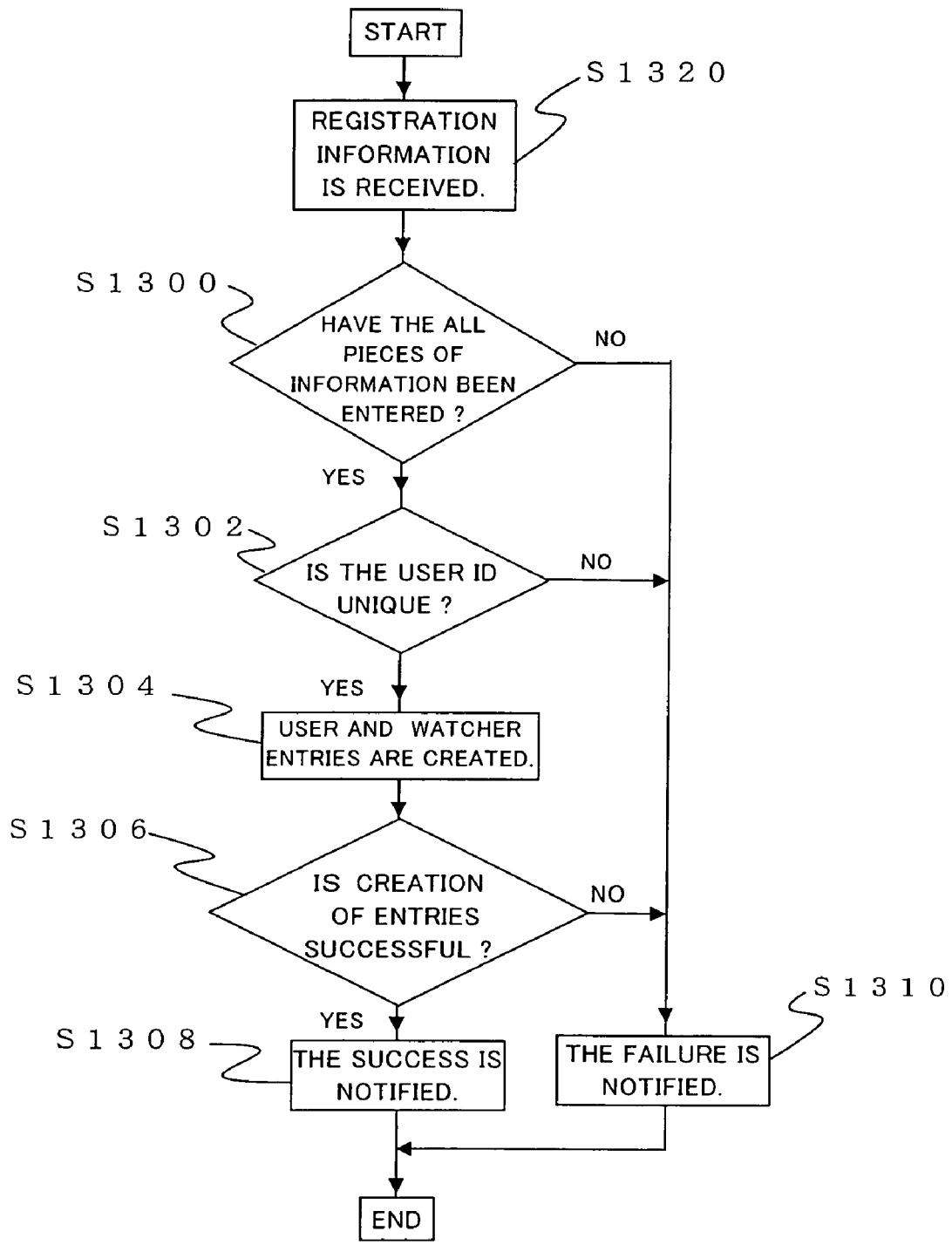
FIG. 13 is a flowchart showing a user registration process.

FIG. 13 is a flowchart showing user registration in the information delivery apparatus 1. After the registration information transmitted from the user client 2 is received (step S1320 in FIG. 13), it is determined whether all the pieces of information on the registration screen 160 in FIG. 9 have been entered (S1300 in FIG. 13). When it is affirmatively determined, the processing unit 42 in the information delivery apparatus 1 checks about whether the user ID is unique by using a database such as the user entry (described later). When the processing unit 42 affirmatively determines, the user entry, the watcher user entry, etc., are created (S1304 in FIG. 13). When the creation is successful (S1306 in FIG. 13), a program in the processing unit 42 is notified of the success. When it is negatively determined in each of steps S1300, S1302, and S1306, the program is notified of the failure in each step.

An outline of the user entry created in the above process is shown in FIG. 10. The user entry 43-1 contains rows for storing indices 43-3, user IDs 43-4, user names 43-30, passwords 43-31, telephone numbers 43-32, e-mail addresses 43-33, and subscribing user indices 43-34. An index is a serial number assigned whenever a user is registered. The pieces of information entered when the user is registered are stored as a user ID, a user name, a password, a telephone number, an e-mail address, etc. As a subscribing user index, the index of another user registered on the subscribing user list, that is, the index of another user from which the user desires information delivery, is stored.

Next, a login process is described below with reference to the login flowchart shown in FIG. 14 of the user client and the login flowchart shown in FIG. 15 of the information delivery apparatus 1.

Figure 14:
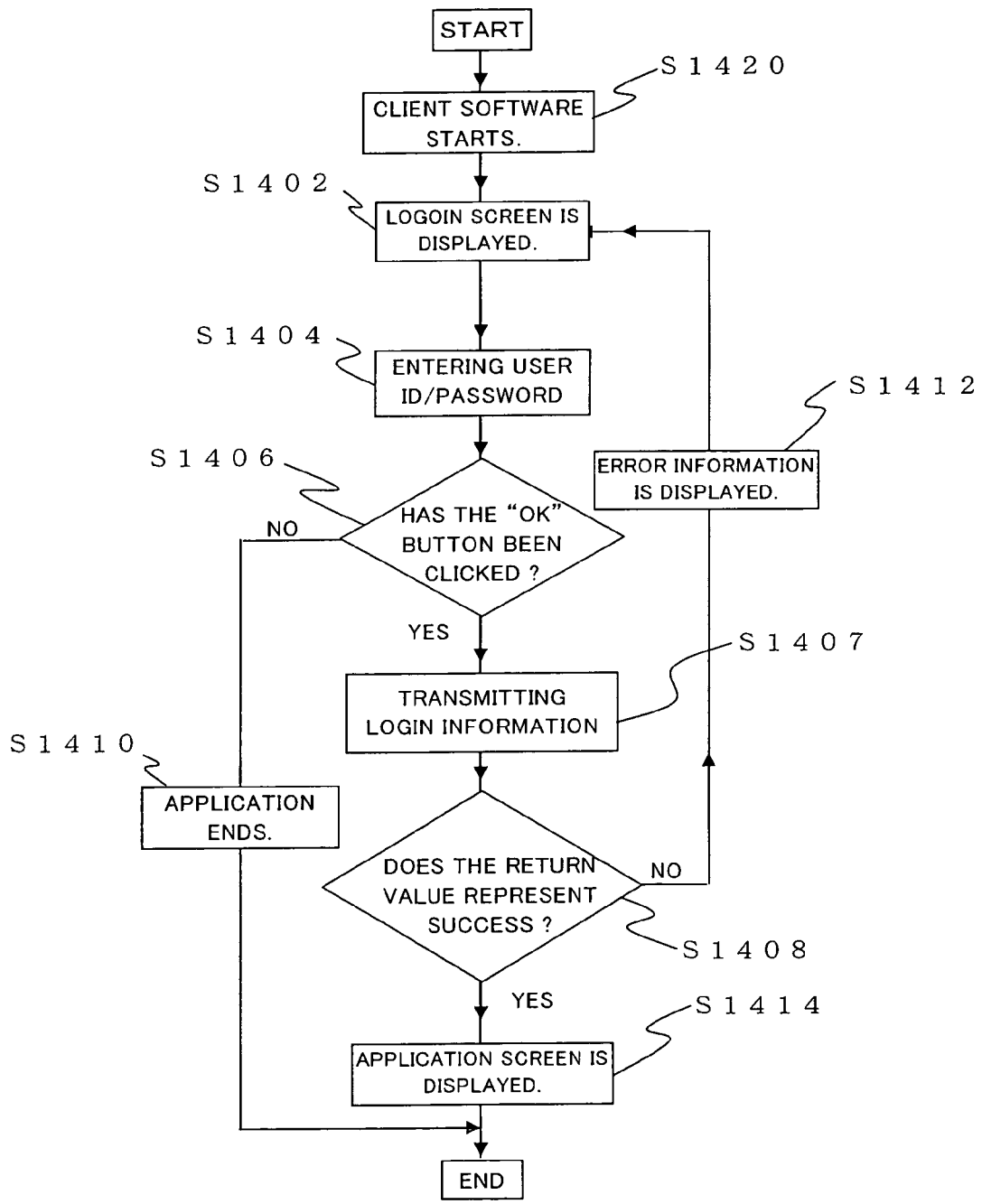
FIG. 14 is a flowchart showing a login process.

Referring FIG. 14, after client software starts (S1420 in FIG. 14) by entering a user ID and a password on a login screen (not shown) displayed on a display unit 25 of the user client 2 or a display unit 35 of the user client 3 (S1402 and S1404 in FIG. 14), and clicking on an OK button on the login screen (S1406 in FIG. 14), login information is transmitted to the information delivery apparatus 1 (S1407 when "YES" in step S1406), and a return value representing success or failure for login is received. When the return value represents success ("YES" in step S1408 in FIG. 14), a client software screen is displayed on the display unit 25 or 35 based on information from the information delivery apparatus 1 (S1414 in FIG. 14), and the login process ends. When the return value represents failure (when "NO" in step S1408 in FIG. 14), error message is displayed on the display unit 25 or 35 (S1412 in FIG. 14), and the login screen is displayed again (S1402 in FIG. 14). Also, by clicking on the CANCEL button in step S1406, the client software is terminated (S1410 in FIG. 14) and the login process ends.

Figure 15:
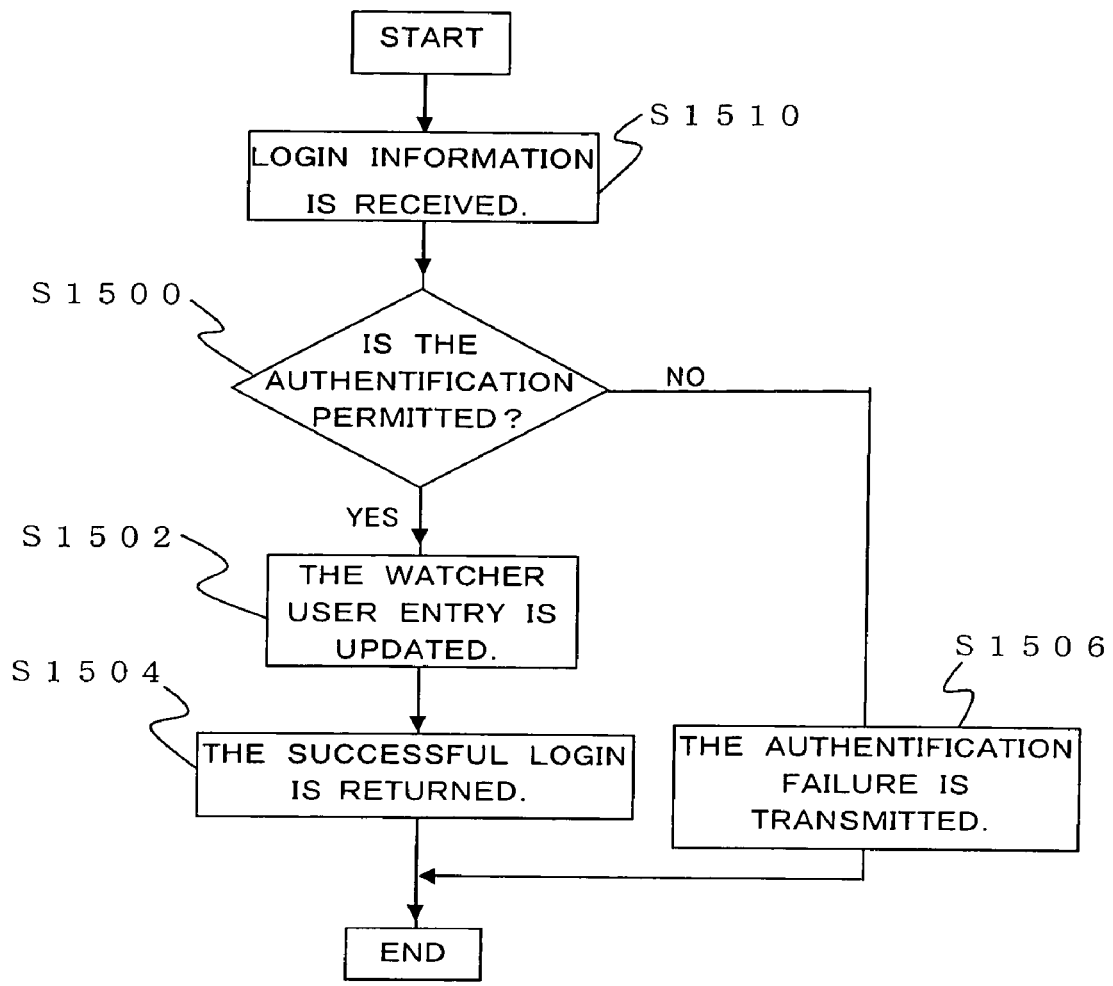
FIG. 15 is a flowchart showing a login process.

On the other hand, in the login process of the information delivery apparatus 1, after login information is received from the user client 2 or 3 (S1510 in FIG. 15), and an account (user ID) and password of the user entry shown in FIG. 10 match the registered account and password, authentication is successful (when "YES" in S1500 in FIG. 15), and the watcher user entry is updated (S1502 in FIG. 15). The success in login is transmitted to the user client 2 or 3 (S1504 in FIG. 15). When the authentication fails, the authentication failure is transmitted to the user client 2 or 3 (S1505 in FIG. 15), and the login process ends.

Next, an outline of the watcher user entry is described with reference to FIGS. 11A, 11B, and 11C which show data formats of the watcher user entry 43-2. The watcher user 43-2 entry stores pieces of information of subscribing users which correspond to user IDs 43-7 and to which information to be provided by one user must be delivered when the information is changed. Specifically, the watcher user entry 43-2 stores the user IDs of subscribing users 43-10, frequencies of updating 43-40 information of subscribing users, last dates of updating 43-41 subscribing user information, the numbers of telephone calls 43-42 are made by information providing users and subscribing users, the numbers of e-mail posting 43-43 is transmitted by information providing users and subscribing users, the types of terminals 43-44 used by subscribing users, the present locations 43-45 of subscribing users, present status (presence) 43-46 based on setting by subscribing users, and priority histories 43-47 in posting to subscribing users. Specifically, in the case of an entry having "ticket" 43-8 as user ID 43-7, the information 43-9, "STAR PEACE TICKETS WILL BE ON SALE TOMORROW AT 10:00", "yamada" and "suzuki", etc., are stored, and for "yamada", "11", "2002/7/10", "0", "0", "MO" (representing a mobile phone), "135, 41" (representing longitude 135 degrees east and latitude 41 degrees north), "out of area" (representing a service area of mobile phones), and "1, 2, 10, 15, 1" (indicating that pieces of information were delivered from the user ID "ticket" to "yamada" in the past in the order of first priority, second priority, tenth priority, fifteenth priority, and first priority) are stored.

In addition, information of subscribing users other than the above pieces of information may be stored.

Addition and deletion of a subscribing user, as described above, are described in association with the user entry 43-1 and watcher user entry 43-2 stored in the storage unit 43 in the information delivery apparatus 1 and with reference to FIGS. 16 to 19.

Figure 16:
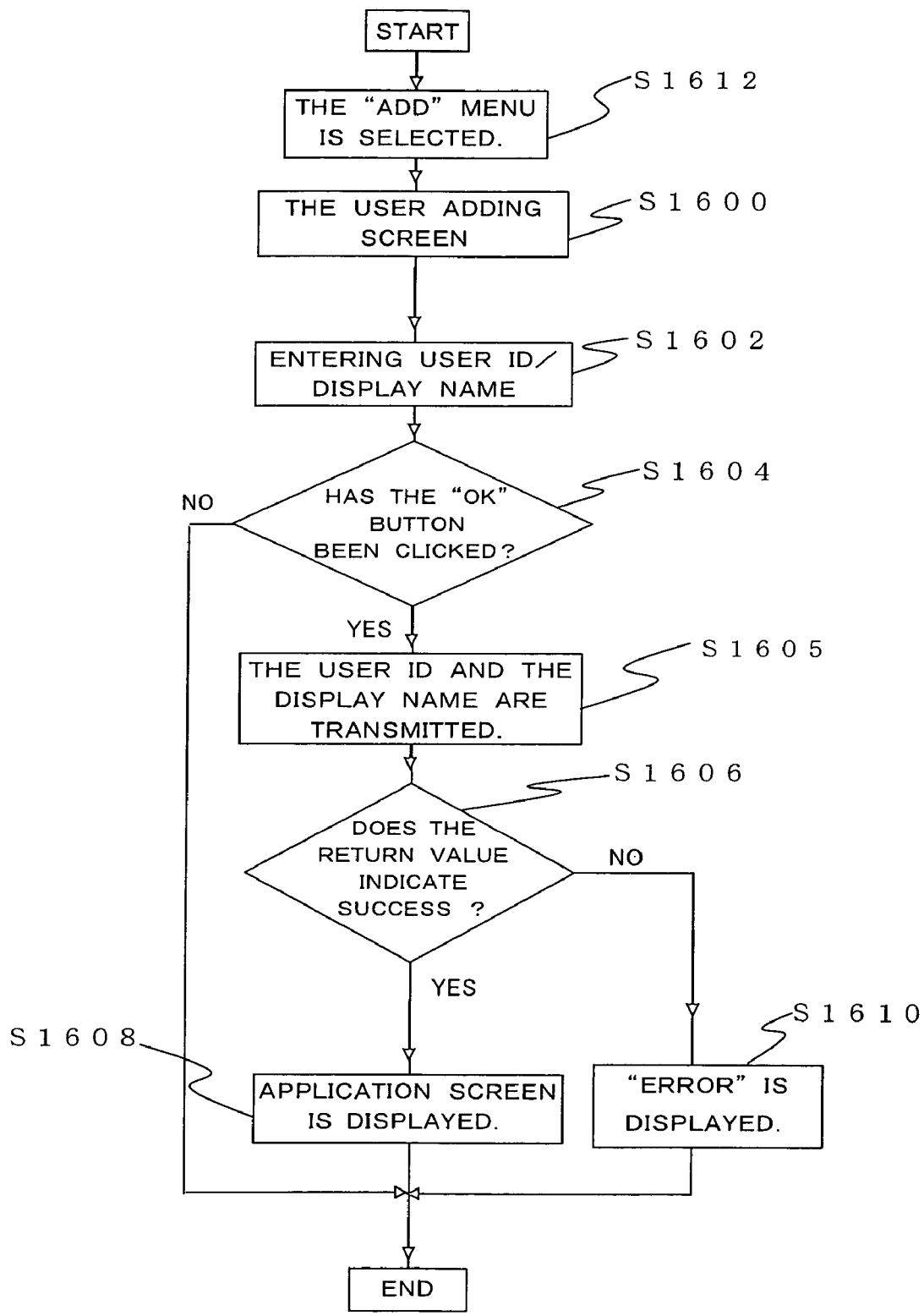
FIG. 16 is a flowchart showing a subscribing user adding process.
Figure 17:
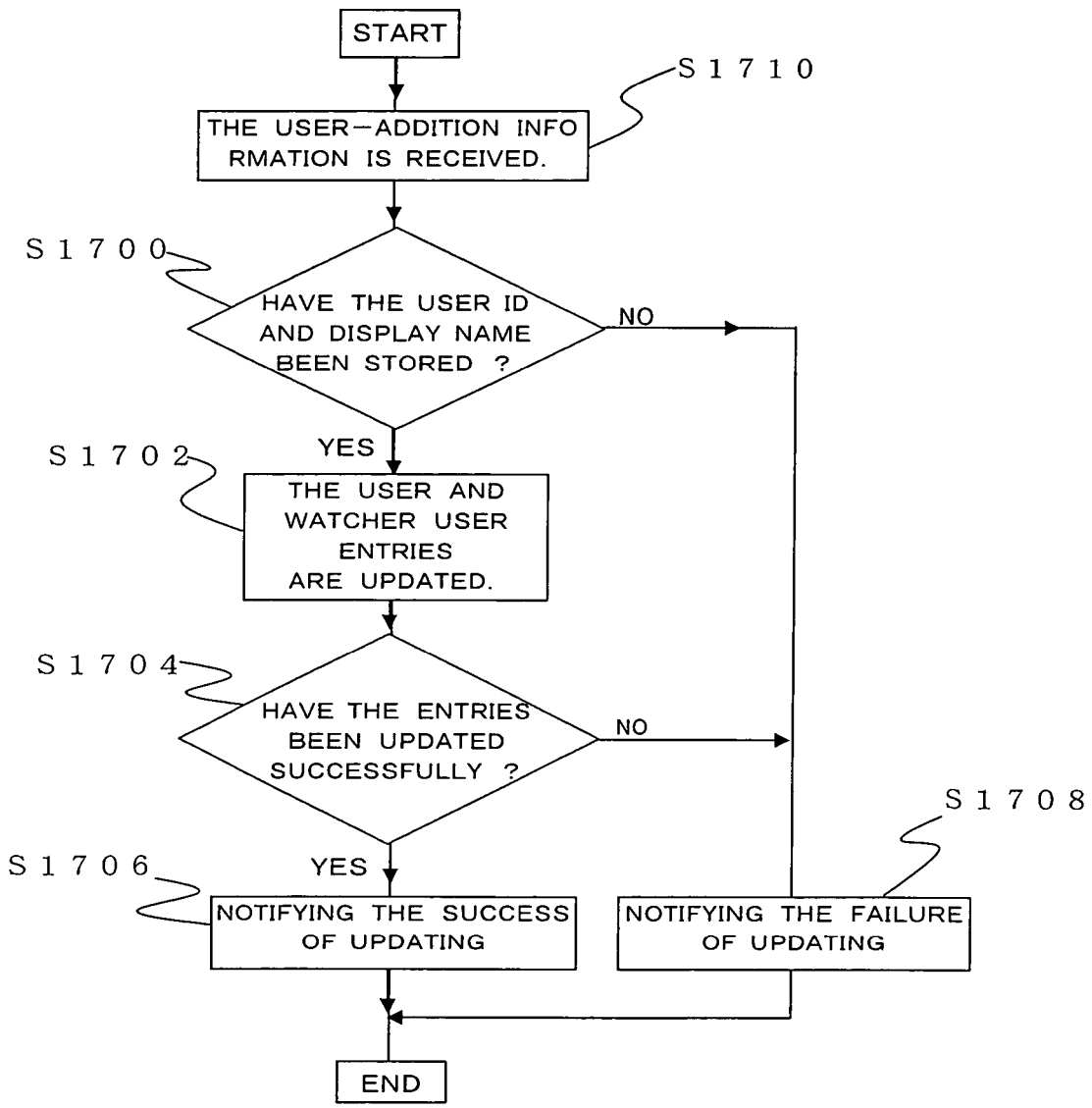
FIG. 17 is a flowchart showing a subscribing user adding process.

FIGS. 16 and 17 are flowcharts showing processes for adding a user. The display unit 25 or 35 displays the client software screen as shown in FIG. 5. Selection of the item "ADD" 112 (S1612 in FIG. 16), which is displayed on the screen 100 as shown in FIG. 5, switches the screen to the user adding screen 130 as shown in FIG. 6 (s1600 in FIG. 16). On this screen 130, by entering a user ID and a display name (user name) (S1602 in FIG. 16) and clicking on the "ADD" button 137 (when "YES" in step S1604 in FIG. 16), the user ID and the display name are transmitted to the information delivery apparatus 1 (S1605 in FIG. 16). The information delivery apparatus 1 checks the transmitted information with the corresponding user entry. When the user entry and watcher entry are successfully updated for adding a subscribing user, a return value from the information delivery apparatus 1 is set to "YES" in step S1606, and an application screen such as the client software screen 100 as shown in FIG. 5 is displayed (S1608 in FIG. 16). When the entries fail to be updated, the determination in step S1606 is "NO" and an error is displayed (S1610 in FIG. 16). Also, in the case of clicking on the "CANCEL" button 138 in FIG. 6, the user adding process ends.

When the user-addition information from the user client 2 is received by the information delivery apparatus 1 (S1710 in FIG. 17), the information delivery apparatus 1 determines whether the user ID and display name (user name) are stored in the user entry (S1700 in FIG. 17). When the user ID and display name are stored, the user entry and the watcher user entry are updated (S1702 in FIG. 17). When the updating is successful ("YES" in S1704 in FIG. 17), the user client 2 is notified of the success and the user adding process ends.

Figure 18:
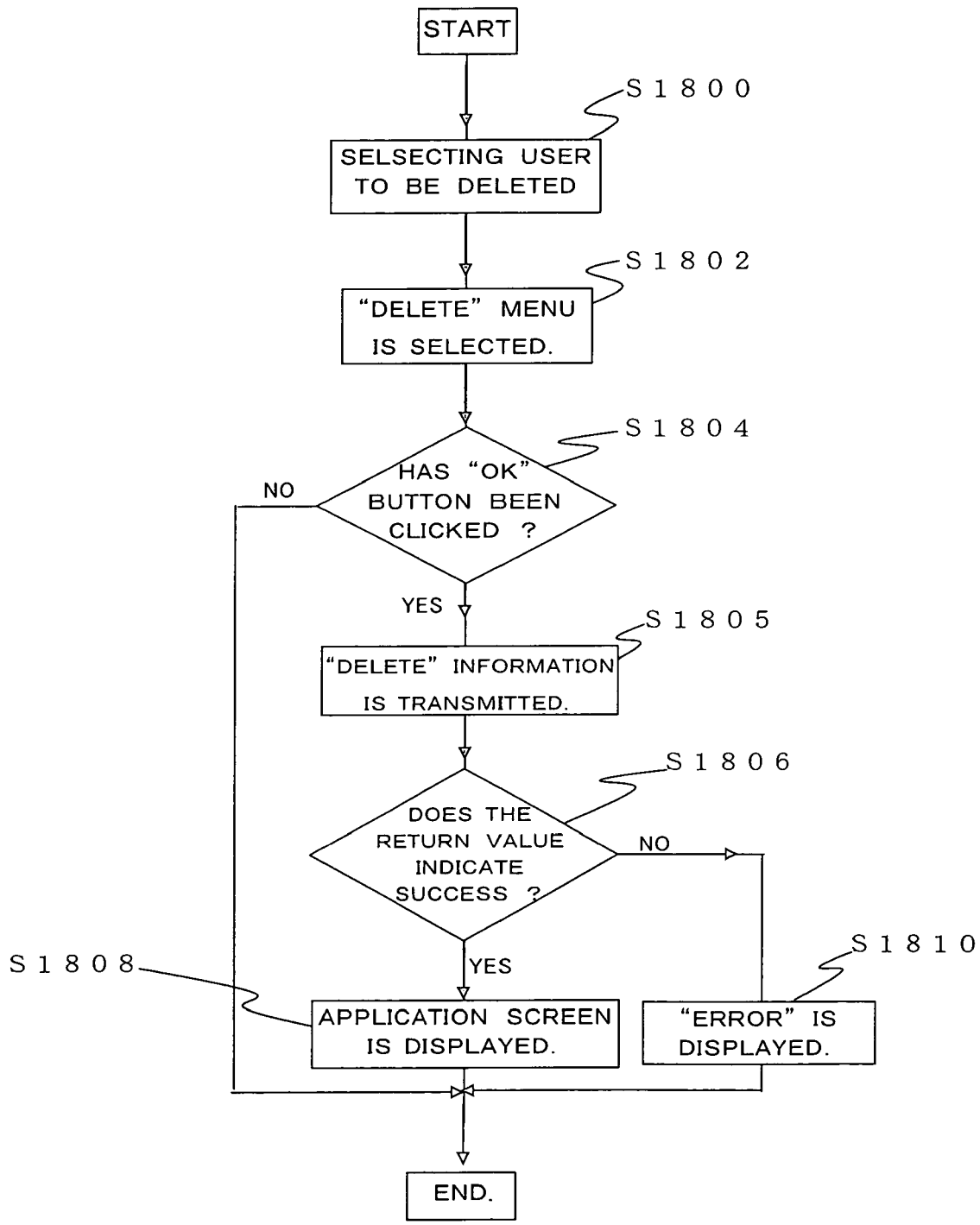
FIG. 18 is a flowchart showing a subscribing user deleting process.
Figure 19:
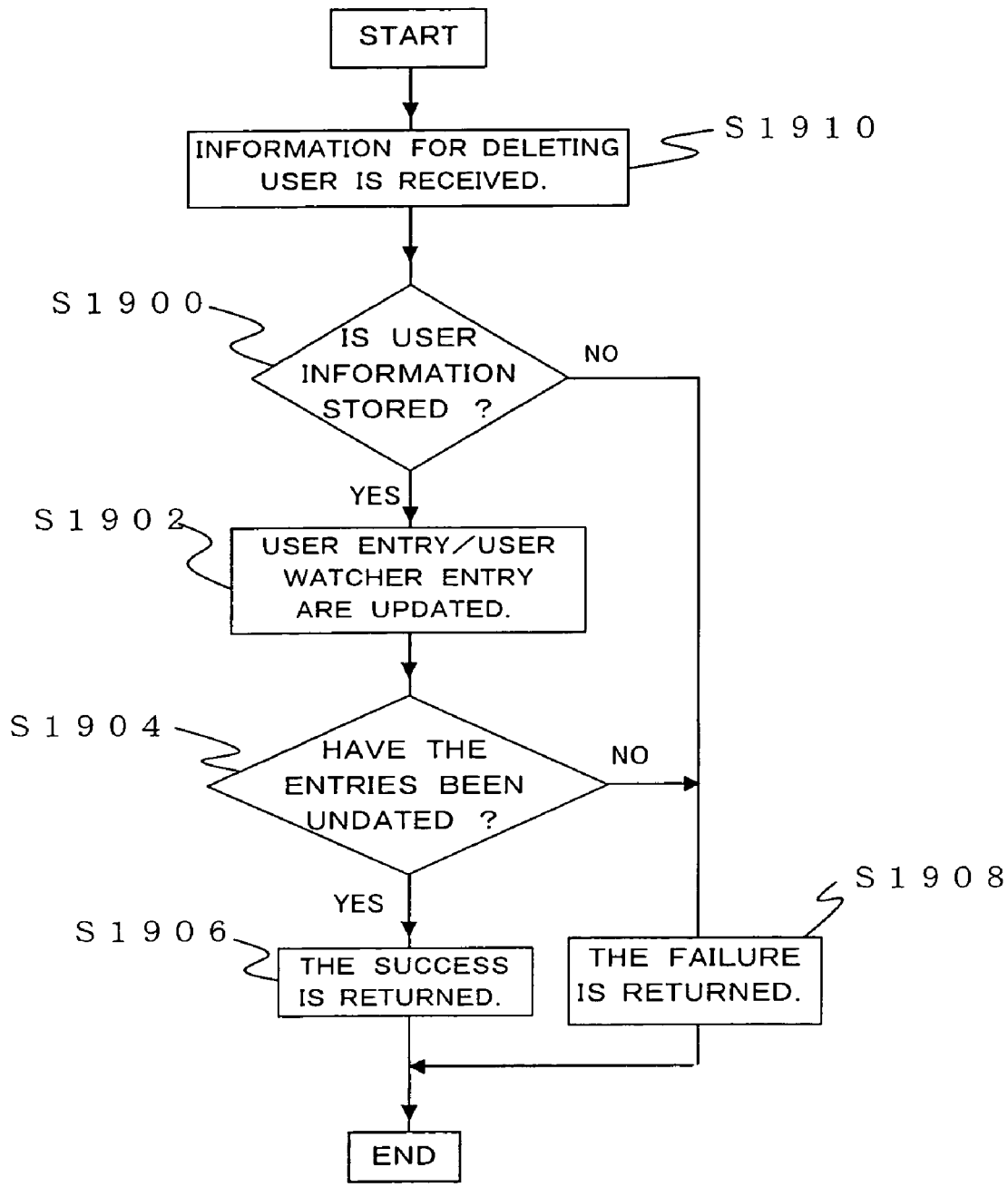
FIG. 19 is a flowchart showing a subscribing user deleting process.

Similarly to the user adding process, the user deleting process shown in FIG. 18 is performed by the user client 2, and the user deleting process shown in FIG. 19 are performed.

Next, regarding a case in which the user "suzuki" updates information, how the watcher user entry of each user corresponding to each index stored in the subscribing user indices of the user "suzuki" is updated is specifically described below.

By setting the information "BUSINESS TRIP FROM JULY 25TH" by the user "suzuki" on the screen shown in FIG. 7, the set information is transmitted from the client software to the information delivery apparatus 1 through the Internet. A program in the information delivery apparatus 1 searches for the user "suzuki" based on a user ID in the user entry (see FIG. 10). After the user ID "suzuki" is found, the subscribing user indices "0, 1, 20" for "suzuki" are acquired and the user ID "ticket" corresponding to the index "0" is acquired. Next, the updating frequency of "suzuki" belonging to the user ID "ticket" in the watcher user entry 43-2 shown in FIG. 11A is incremented by one, and the present time is stored in the field of the last date and time of updating. Also, since the program determines which of a PC client and a mobile phone browser is used by "suzuki" when logging into the information delivery apparatus 1, the determined type is written in the terminal type field in the watcher user entry beforehand ("MO" is written in the terminal type of "suzuki" in FIG. 11A). Whenever a user logs into the information delivery apparatus 1, information of a terminal that the user uses is written in the terminal type field. Also, when location information obtained when the user "suzuki" sets information is acquired, the acquired location information "134, 39" (representing longitude 139 degrees east and latitude 39 degrees north) is stored in the position field of "suzuki" in "ticket" in the watcher user entry as shown in FIG. 11A. Acquisition of the location information is also realized such that, when the PC or mobile phone is provided with a GPS (global positioning system) feature, the longitude and latitude of a location are transmitted with the set information. In addition, the acquisition is also realized such that, when a location can be roughly specified by using information from a base station, this location information is transmitted with the user-set information. By selecting a user from the subscribing user list and selecting the items "MAIL" and "TELEPHONE", the server can be notified of another party in telephone or e-mail communication before actual communication by e-mail or telephone is performed. Based on the information notified, the server can update the number of telephone calls and the number of times e-mail can be updated in the watcher user entry. Instead of the number of telephone calls, also duration of telephone call may be used. Regarding "PRESENCE", "PRESENCE" set by the user in FIG. 7, a state about whether a client is in a login state, or information concerning a telephone network notification, etc., can be transmitted from the user client to the information delivery apparatus 1. These pieces of information acquired by the information delivery apparatus 1 may be stored as "PRESENCE" information in the watcher user entries 43-2 shown in FIGS. 11A, 11B, and 11C. For example, "out of area" represents "outside a communication range", and "empty" represents "state of no telephone/data communication". When the information delivery apparatus 1 and the user clients 2 and 3 are in cooperation with the telephone network, also pieces of "PRESENCE" information of users in the above case can be acquired.

The "online" and "offline" states shown in "PRESENCE" can be distinguished based on the state of logging into the information delivery apparatus 1. Moreover, other "PRESENCE" information, such as "DND (Don't Disturb)" and "Away (absence)" as user-set "PRESENCE", may be stored.

Regarding the priority history, in this embodiment, up to five priority histories in the case of posting information in the past can be recorded. The number of priority histories is not limited to five, but may be greater than five. Watcher entry updating is performed for the indices of all the subscribing users, that is, for the user "suzuki", the updating is performed on "0, 1, 20".

Next, an information delivery operation of the information delivery apparatus 1 is described below by exemplifying a case in which the user ID "ticket" 43-8 updates information. It is configured in the watcher user entry 43-2 in FIG. 11A that the user "ticket" can be notified by the users "yamada", "suzuki", "tanaka" and "satou" when information is changed. When the user "ticket" sets information, the processing unit 42 in the information delivery apparatus 1 searches for the user ID "ticket" in the user entry shown in FIG. 10.

After the user ID "ticket" is found, subscribing user indices are acquired. Tables of other watcher user entries are not updated since the user "ticket" has nothing as subscribing user indices as shown in FIG. 10.

When the information is updated into "STAR PEACE TICKETS WILL BE ON SALE TOMORROW AT 10:00" shown in 43-9 of FIG. 11A, the updated information is stored in the information field of the user ID "ticket" in the watcher user entry. The information is delivered to the subscribing users on the watch user list of the user ID "ticket", that is, "yamada", "suzuki", "tanaka" and "satou". The information delivery priorities are based on, for example, an information-updating frequency and last updating date in the watcher user entry of each user to which information is delivered.

Regarding assignment of the priorities, the priorities may be set in ascending order of last updating dates. In the case shown in FIG. 11A, the priorities are in the order of "tanaka", "suzuki", "yamada", and "satou".

Regarding a manner other than the above determination of the priorities, when the number of times each of "yamada", "suzuki", "tanaka" and "satou" accesses a web site can be counted by the information delivery apparatus 1, their priorities may be determined based on information of the number of times the user accesses the web site.

The determined priorities are added to the start of the priority history. Also, the delivered information is displayed on the screen in a popup window or the like by each client. Alternatively, when the delivered information is transmitted to a mobile phone, the information may be received by an e-mail feature in the mobile phone.

A process of the user client 2 for updating information to be delivered, as described above, is described below with reference to FIGS. 20 and 21.

Figure 20:
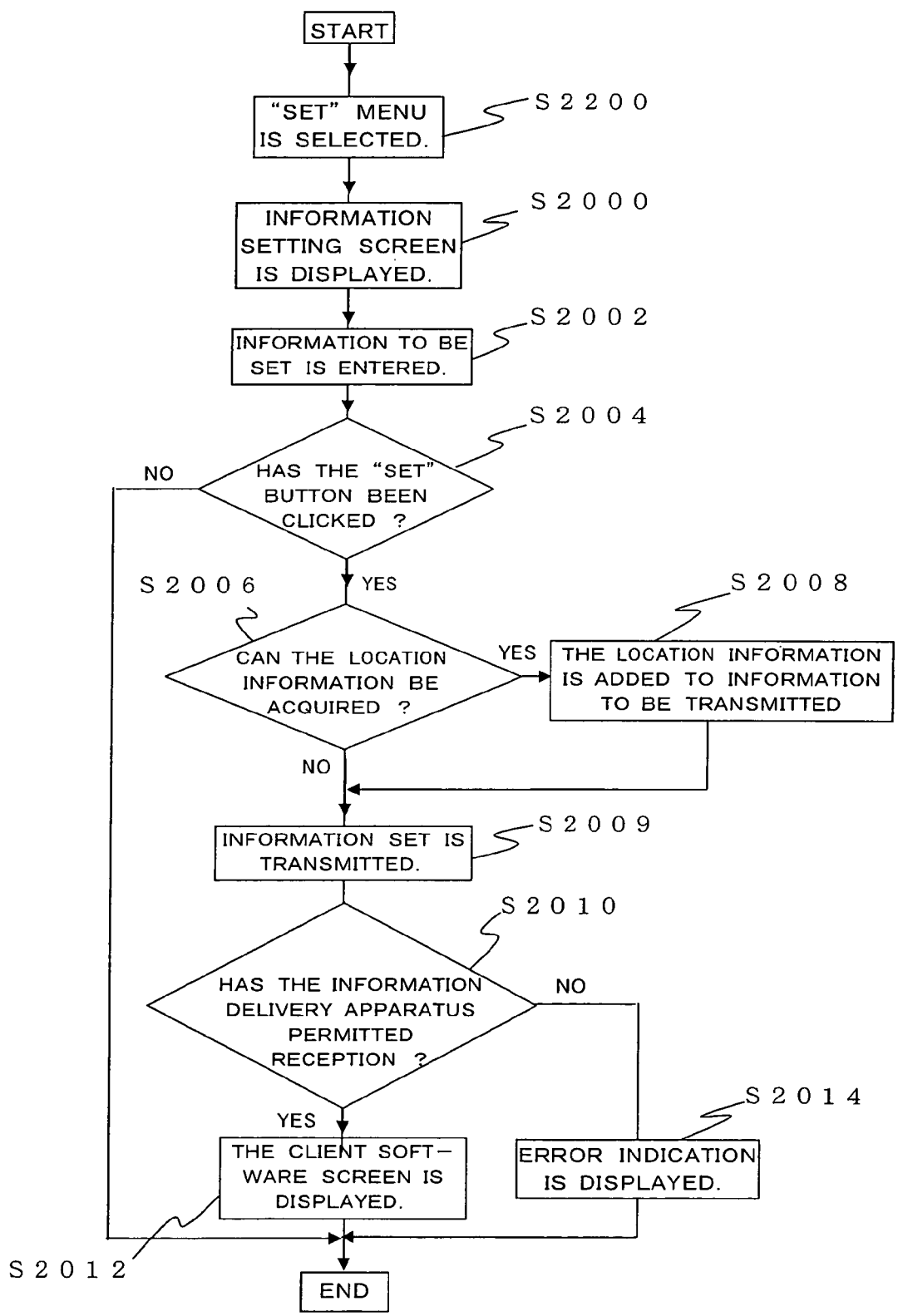
FIG. 20 is a flowchart showing an information updating process.
Figure 21:
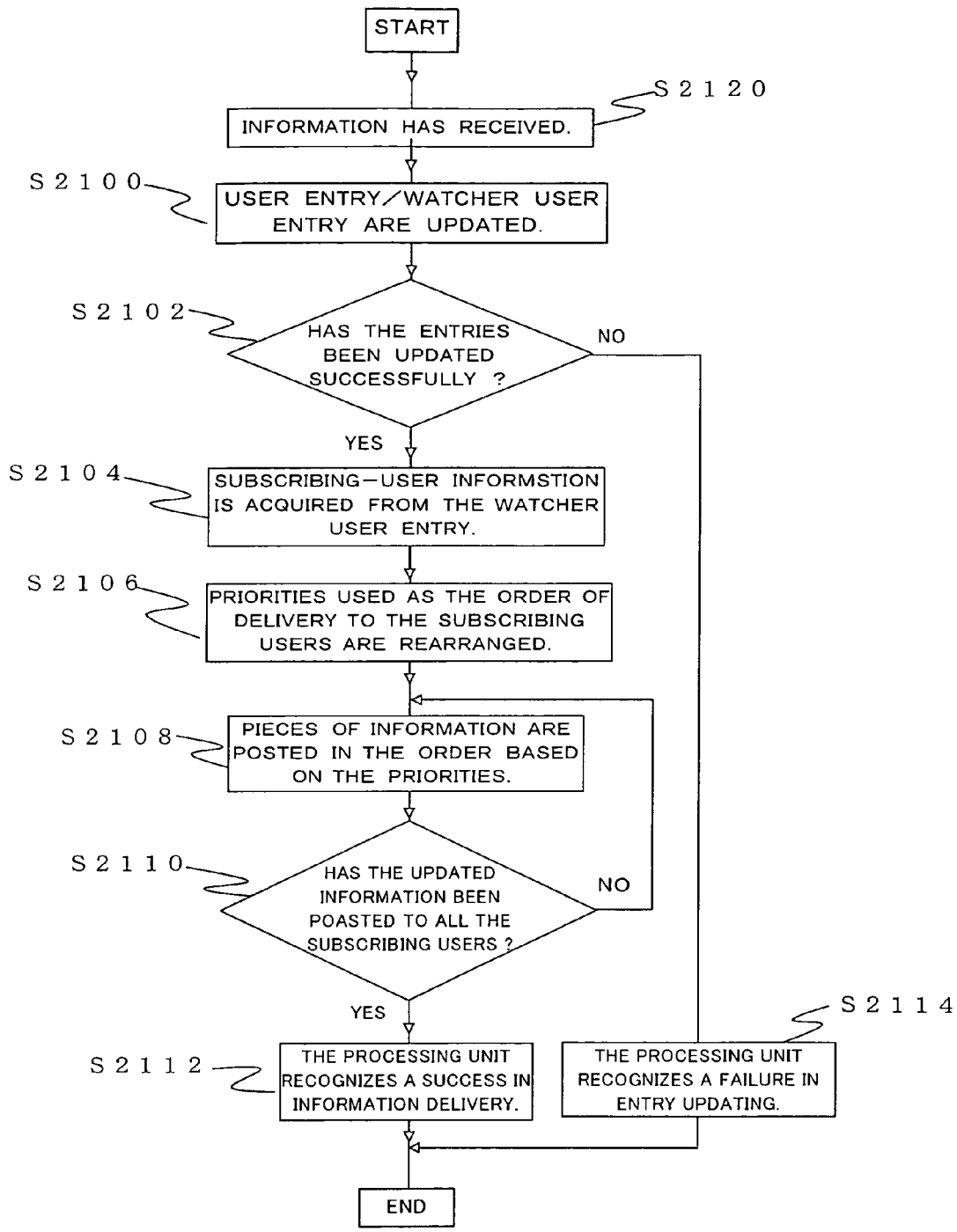
FIG. 21 is a flowchart showing an information setup/posting process.

Referring to FIG. 20, the user client 2 selects the "SET" item on the client software screen 110 shown in FIG. 5 (s2200 in FIG. 20), and the information setting screen 140 is displayed as shown in FIG. 7 (S2000 in FIG. 20). By entering information in the information field on this screen 140 (S2002 in FIG. 20) and clicking on the "OK" button 148 ("YES" in step S2004 in FIG. 20), for example, when additional information, such as a user's location, can be acquired (e.g., when the terminal of the user client 2 has a feature such as a GPS and can perform transmission to the information delivery apparatus 1) ("YES" in step S2006 in FIG. 20), in step S2008, the additional information is added to the information to be transmitted, and the obtained information is transmitted (S2009 in FIG. 20). When the information delivery apparatus 1 permits reception, it sends, to the user client 2, a return value representing "success" ("YES" in step S2010 in FIG. 20). The process returns to the client software screen shown in FIG. 5 (S2012 in FIG. 20), and ends. In step S2006, when the location information cannot be acquired (when "NO" in step S2006 in FIG. 20), the process proceeds to steps S2010 and S2012, and the updating process ends. In step S2010, when the return value represents failure (indicated by "NO"), an error indication is displayed on the display unit 25 or 35 of the user client 2 or 3 (step s2014 in FIG. 20), and the updating process ends.

After receiving information delivered from the user client 2 (S2120 in FIG. 21), the information delivery apparatus 1 updates the user entry and watcher user entry, as described above (S2100 in FIG. 21). When updating of each entry in the user and watcher user entries is successful (when "YES" in step S2102 in FIG. 21), subscribing-user information is acquired from the watcher user entry, and priorities used as the order of deliver to the subscribing users are rearranged and pieces of information updated with the priorities are posted to all the subscribing users in the order of deliver based on the priorities (steps S2104 to 2108 in FIG. 21). After the pieces of the updated information are posted to all the subscribing users ("YES" in step S2110), the processing unit 42 recognizes a success in information delivery and the information configuration and posting ends. Also, in step S2102, when the entry updating fails ("NO" in step S2102 in FIG. 21), the processing unit 42 recognizes the failure and the information configuration and posting ends.

Figure 22:
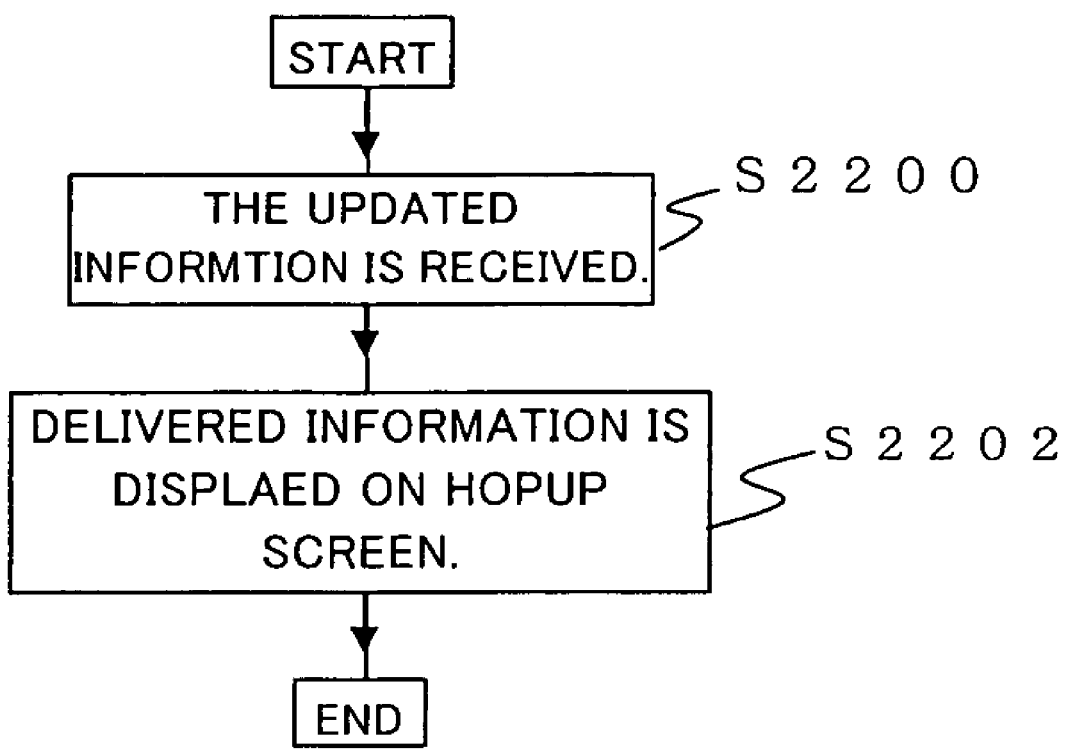
FIG. 22 is a flowchart showing an information posting process.

As shown in FIG. 22, the updated information is delivered from the information delivery apparatus 1 to one user client 2 (as a subscribing user) in user clients which desires information delivery (S2200 in FIG. 22). The delivered information is displayed on the dispaly unit 25 in the user client 2 in a popup screen (S2202 in FIG. 22).

Figure 23:
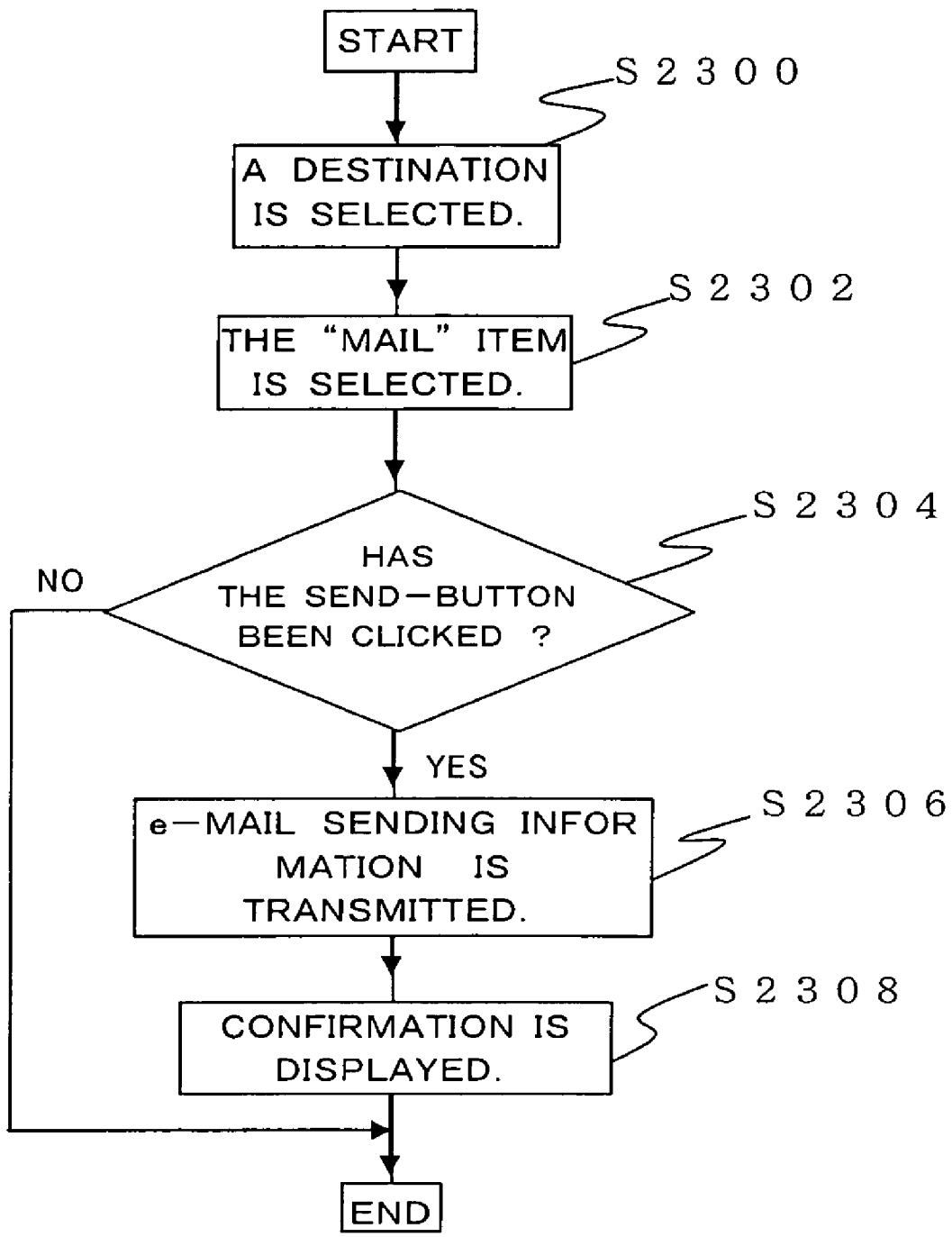
FIG. 23 is a flowchart showing an e-mail sending process.

E-mail sending in a case in which, based on the information displayed on the popup screen, the user responds to a sender of the information by e-mail is described below with reference to the flowchart shown in FIG. 23.

The displayed popup screen allows the user to know that the information has been delivered, and checks on users on the subscribing user list on the client software screen allow the user to arrival of the information. From the list, a transmitting destination is selected (S2300 in FIG. 23), the "e-MAIL" item 115 as shown in FIG. 5 is selected as a communication method (S2302 in FIG. 23), and a send button is clicked on (S2304 in FIG. 23). Clicking the send button allows the mail sending information to be sent to the information delivery apparatus(S2306 in FIG. 23), and a mail sending screen installed in the user client 2 is displayed (S2308 in FIG. 23). And then the mail sending process ends. Also, by clicking on the "CANCEL" button on the information notification system screen (shown in FIG. 8) ("NO" in step S2304 in FIG. 23), the mail send process ends.

Figure 24:
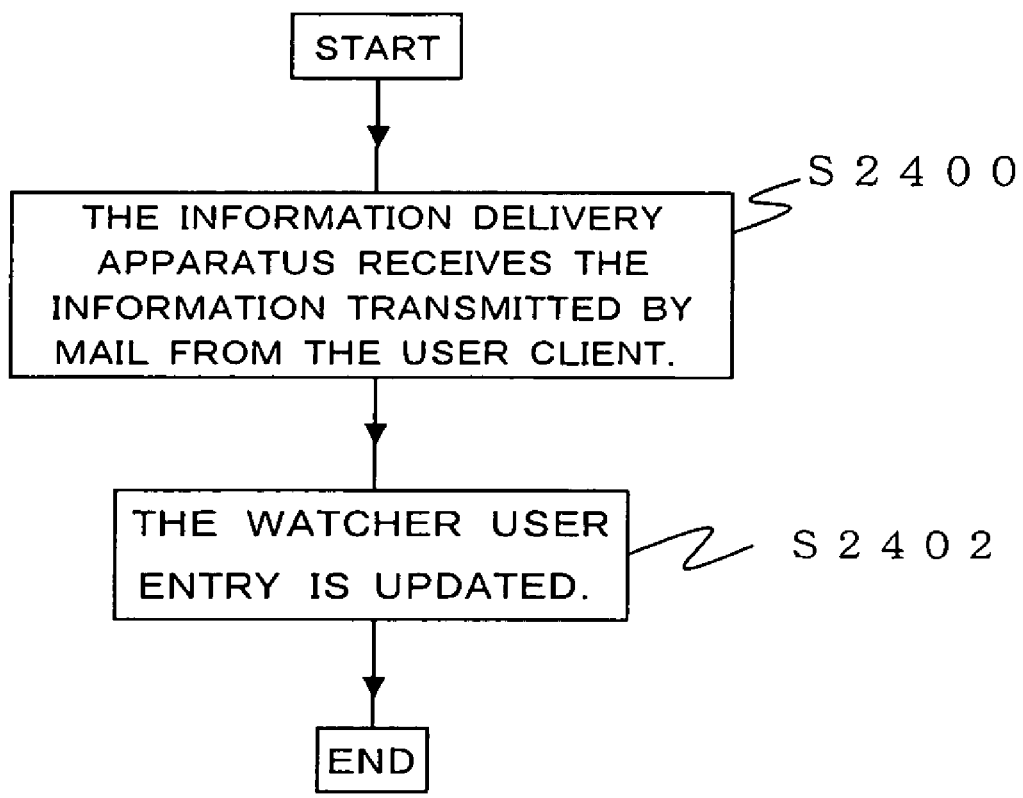
FIG. 24 is a flowchart showing an e-mail sending process.

When receiving the information transmitted by e-mail from the user client 2 (S2400 in FIG. 24), the information delivery apparatus 1 increments, by one, the updating frequency of the user client 2 in the watcher user entry of one that transmits information to the user client 2, and also updates a mail sending updating date, the number of times mail is transmitted, etc. (S2402 in FIG. 24).

Figure 25:
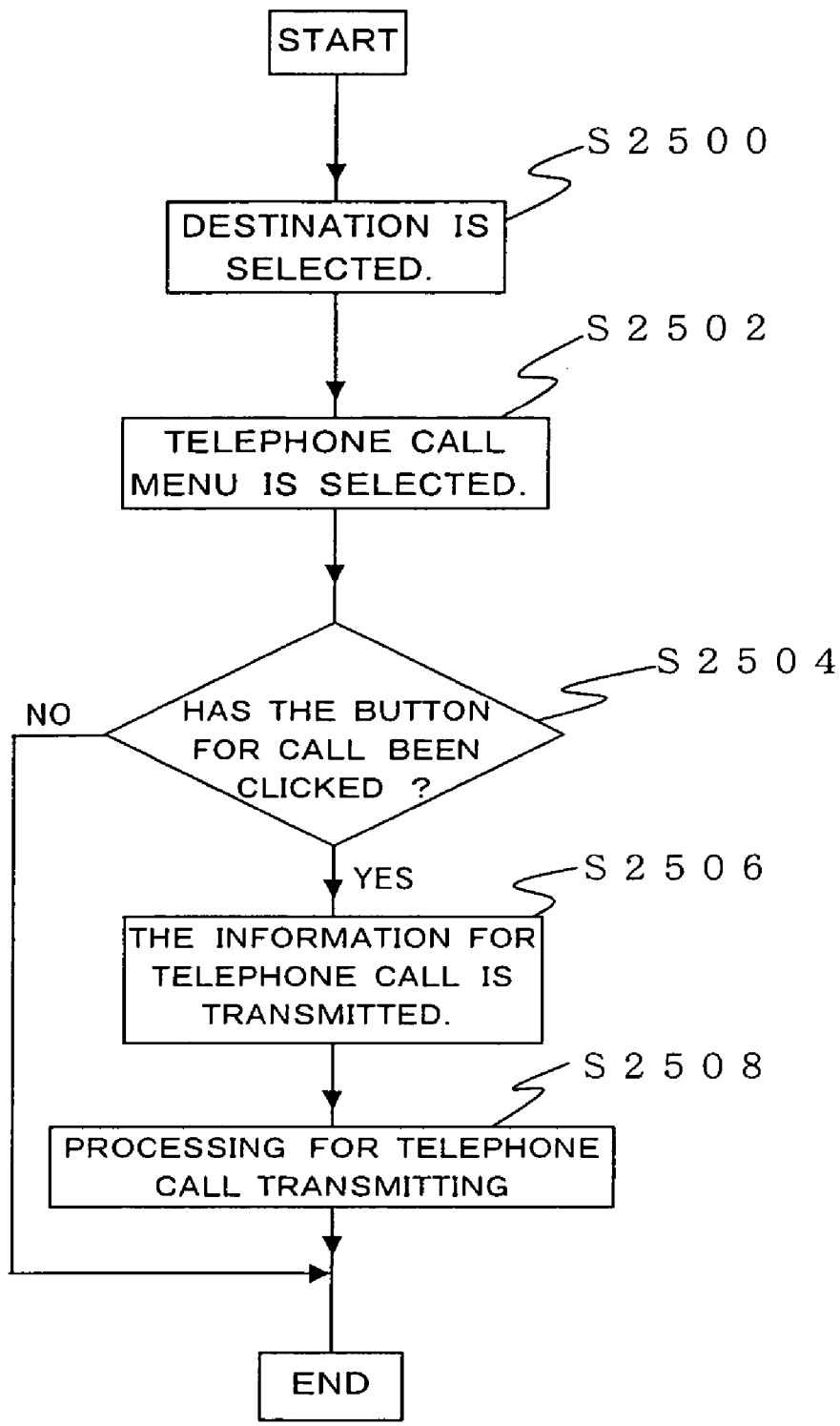
FIG. 25 is a flowchart showing a telephone call process.
Figure 26:
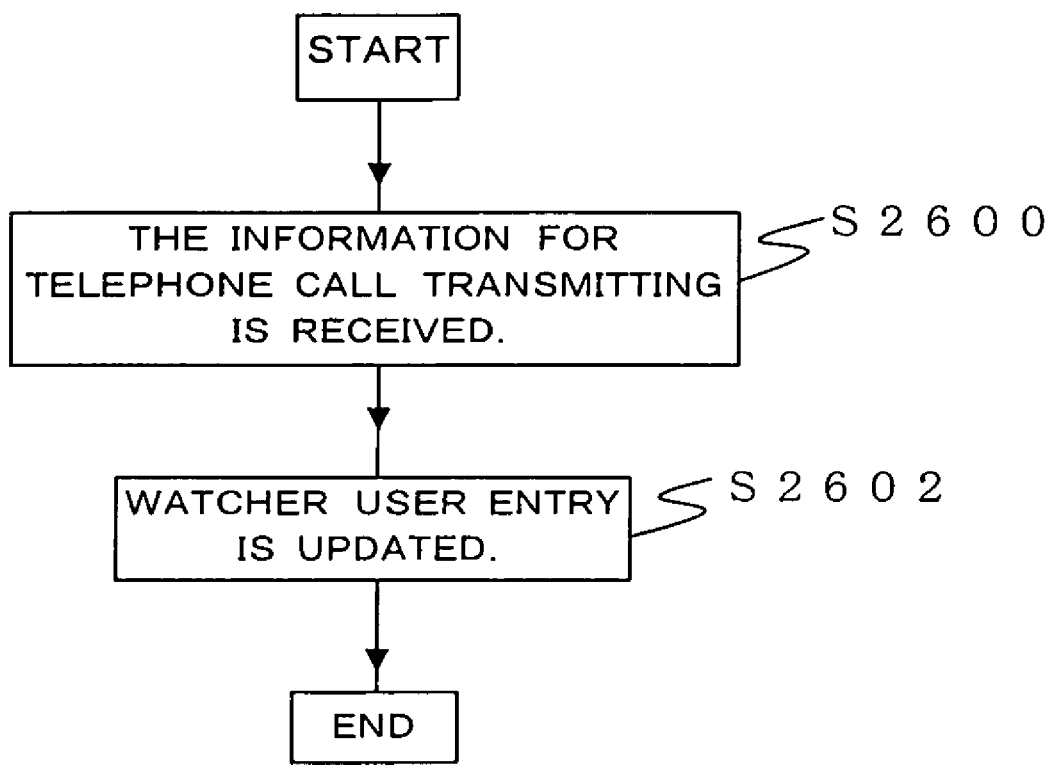
FIG. 26 is a flowchart showing a telephone call process.

A process of the user client 2, which receives delivered updated information, in a case in which the user client 2 responds by telephone, and a process of the information delivery apparatus 1 are similarly performed as shown in FIGS. 25 and 26.

In information delivery, delivery priorities may be determined depending on the present status of a user to which information is delivered. Regarding the present status of the user, the terminal information, the location information, "PRESENCE", and other available information, which are stored for each user in the user entry 43-1 in FIG. 10, may be used.

In addition, information-delivery order may be determined by assigning priorities based on terminal types (shown in FIG. 11A as TYPE OF TERMINAL 43-44), such as assignment of priority to a user using a PC, or assignment of priority to a user using a mobile phone. Also, the delivery order may be determined based on the terminal type in combination with information, such as an updating frequency and a last updating date and time (see FIG. 11A). For example, when the information delivery order is determined so that a user using a mobile phone is given high-priority, and when terminal types are identical, a user having a greater updating frequency is given higher priority, pieces of information corresponding to "ticket" in FIG. 11A have the order of "yamada", "suzuki", "tanaka" and "satou".

In addition, the information delivery order may be determined based on user's "PRESENCE". Also in this case based on "PRESENCE", the information delivery order may be determined in combination with information such as an updating frequency and a last updating date and time. For example, in a case in which priority is given to a user to which information can be posted in real time and whose "PRESENCE" is "empty" or "on line", and when there are a plurality of users to which information can be posted in real time, a user having a greater updating frequency is given higher priority, the case shown in FIG. 11A has determined information-delivery order of "tanaka", "suzuki", "yamada", and "satou".

When information delivery is impossible in real time, information can be posted by e-mail or other means.

Similarly, a user whose present location is close to a user having updated information may be set to have high priority in information delivery. Also in this case, the information delivery order may be determined in combination with an updating frequency, a last updating date and time, location information, etc. Moreover, the user updating information may determine the information delivery order based on location information by using the client software to designate the location information.

In information delivery, the information delivery order may be determined in accordance with users' priority histories in the past. By combining the priority histories in the past with the number of telephone calls, the number of times mail is transmitted, a last updating date and time, etc.

In addition, based on subscribing users' priority histories, the information delivery order can be determined. Also in this case, the information delivery order may be determined in combination with an updating frequency, a last updating date and time, etc. As a manner of using priority histories, even a technique may be employed in which priority is given to a user having a high priority in the previous time, conversely, priority is given to a user having a low priority in the previous time, or priority is given to a use having high priorities in the past five times. By way of example, in the case of posting information corresponding to the user "yamada" shown in FIG. 11B, and in the case of giving priority to a user having high priority in the previous time, information is posted in the order of "suzuki" and "tanaka". In the case of giving priority to a user having low priority in the previous time, information is posted in the order of "tanaka" and "suzuki".

Moreover, based on the number of telephone calls and the number of times mail is sent between an information transmitting user and an information-delivered user, the information delivery order may be determined. Also in this case, the information delivery order may be determined in combination with an updating frequency, a last updating date and time, etc. For example, in the case of posting the information corresponding to the user "yamada", when priority is given to a user having a large number of telephone calls, information delivery is performed in the order of "tanaka" and "suzuki". In the case of giving priority to a user having a large number of times mail is sent, information delivery is performed in the order of "suzuki" and "tanaka". Not only by using the number of telephone calls and the number of times mail is sent, but also by using the number of times message transmission is performed by instant message, the number of times "PRESENCE" for a particular party is set up, and a communication history of another type, the information delivery order may be determined.

Next, a configuration for adding various types of information concerning posting in the case of updating information by a user is described below.

Second Embodiment

Also an information delivery apparatus 1 according to a second embodiment of the present invention may be identical in configuration to the above-described information delivery apparatus 1. The information delivery apparatus 1 according to the second embodiment, in which part of information to be delivered is replaced depending on delivery priority, is described below with reference to FIGS. 27 to 30.

Figure 28:
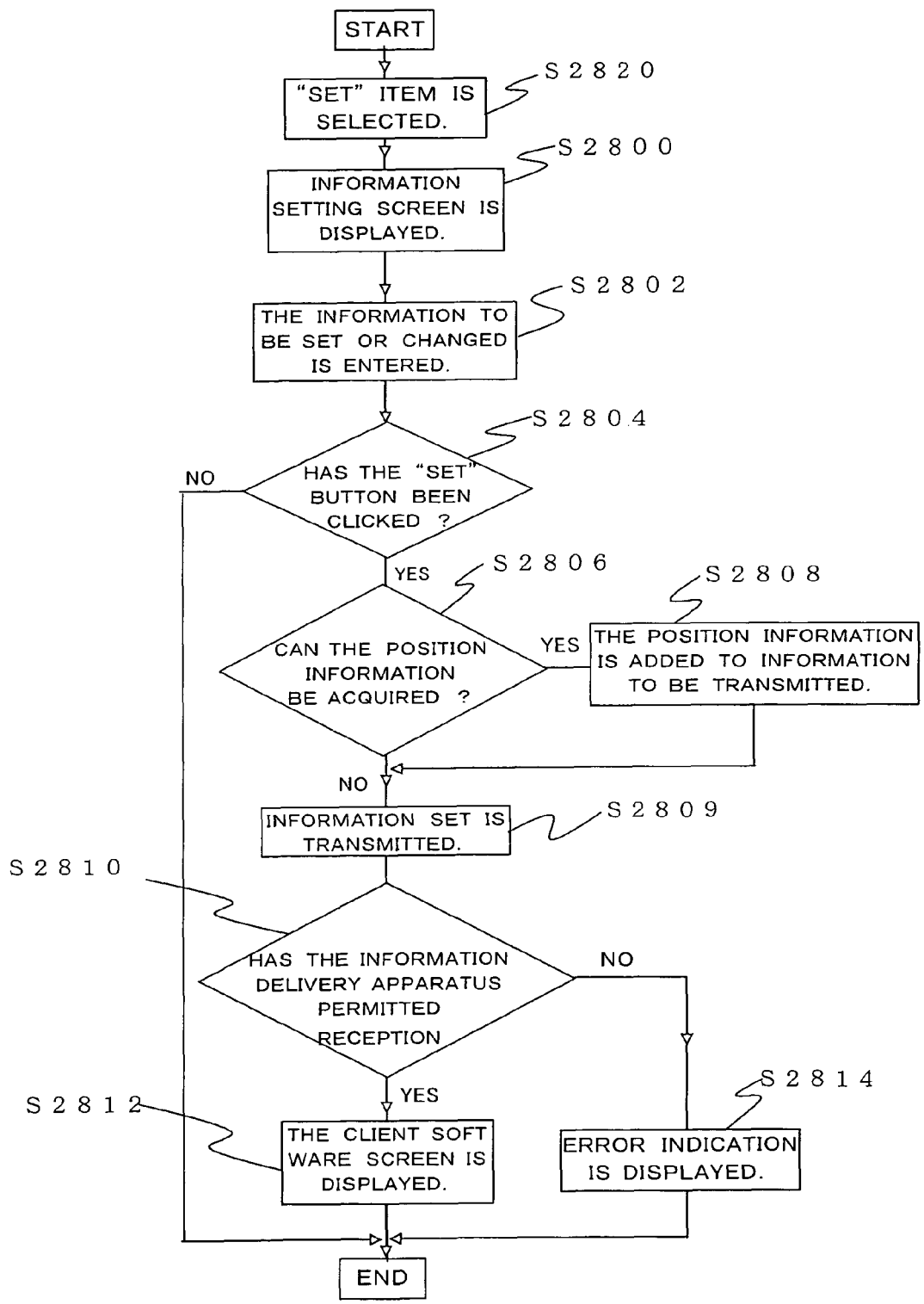
FIG. 28 is a flowchart showing an information updating process with information replacement.

The information setup screen 2700 is displayed by selecting the "SET" item 114 on the menu part on the client software screen 100 shown in FIG. 5 (s2820 in FIG. 28) and an information setup screen 2700 which includes replacement information (which is entered an area 2720) is displayed on the display unit 25 or 35 in the user client 2 when part of information to be delivered is replaced depending on delivery priority (S2800 in FIG. 28).

Figure 27:
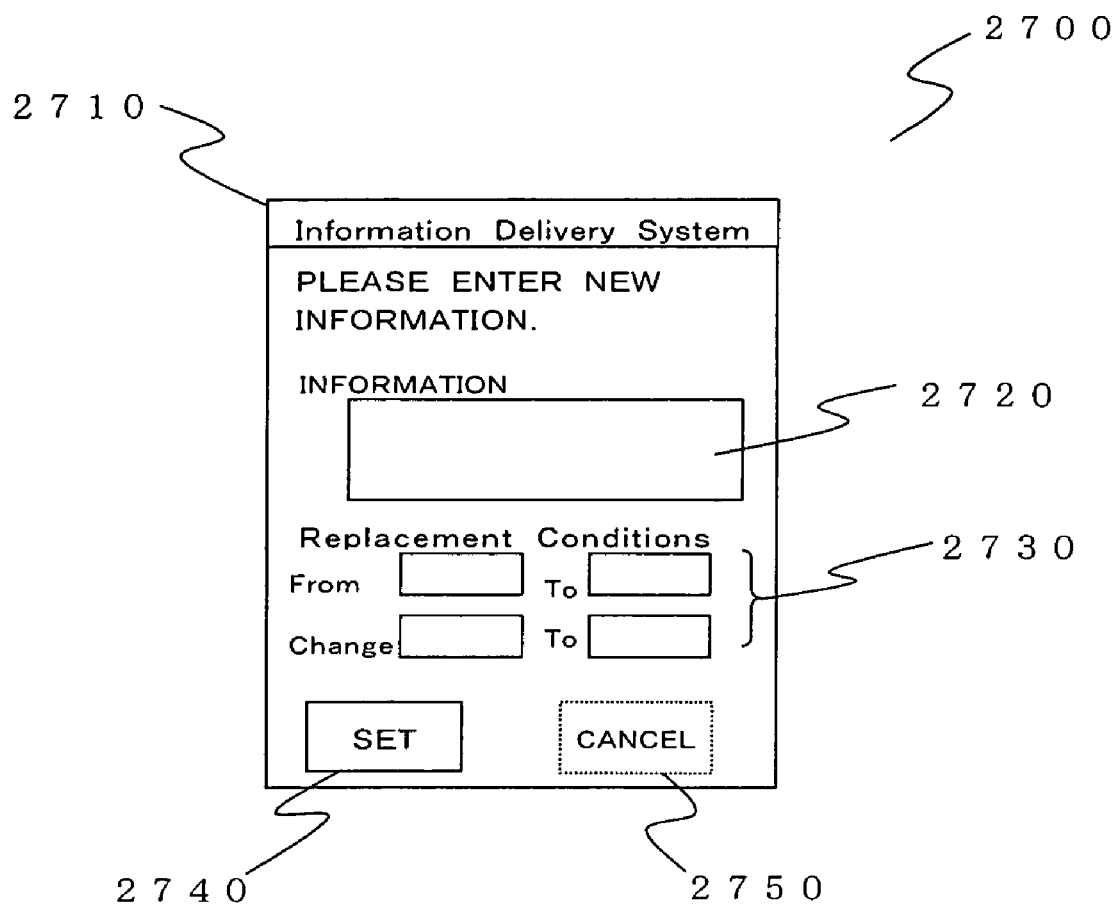
FIG. 27 is an illustration of an example of an information setup screen shot including replacement information.

Setup information (information to be delivered) is entered in the "INFORMATION" field 2720 shown in FIG. 27. By entering a sentence partitioned by the symbol "%s", such as "SPECIAL DINNER%S:FIRST 10 PERSONS FROM 7:00, RESERVATION ESSENTIAL%S" (S2802 in FIG. 28), the portion between the symbols "%s" is changed based on the "REPLACEMENT CONDITION" under the "INFORMATION" field 2720 when the information is posted to the information delivery apparatus 1. The portion "FIRST 10 PERSONS FROM 7:00, RESERVATION ESSENTIAL" is an initial value. When the replacement condition does not apply, the initial value is used. For the replacement condition, delivery priorities to be replaced (e.g., 20th to 100th priorities in delivery) can be designated, and a character string to be replaced and a replacement character string can be set (e.g., the original character string "FIRST 10 PERSONS FROM 7:00" to the replacement character string "FIRST 15 PERSONS FROM 8:00"). By entering information which replaces the original information, and clicking on the "SET" button 2740(S2804 in FIG. 28), similarly to steps S2006, S2008, and S2010 in FIG. 20, it is determined whether location information can be added to information to be transmitted, and the setup information is transmitted to the information delivery apparatus 1 (S2809 in FIG. 28). When a return value from the information delivery apparatus 1 is checked in step S2810 in FIG. 28 and is accepted ("YES" in step S2810), an application screen, such as the client software screen 100 shown in FIG. 5, is displayed (S2812 in FIG. 28). When the return value is not accepted by the information delivery apparatus 1 ("NO" in step s2810 in FIG. 28), an error screen is displayed on the display unit 25 or 35 in the user client 2. In either case, an information-replacement information changing process ends. Also, in step S2804, the case of clicking on the "CANCEL" button 2750 ends information-replacement information changing process ends.

Next, an information-replacement information setup/posting process of the information delivery apparatus 1 is described below with reference to the flowchart shown in FIG. 29.

Figure 29:
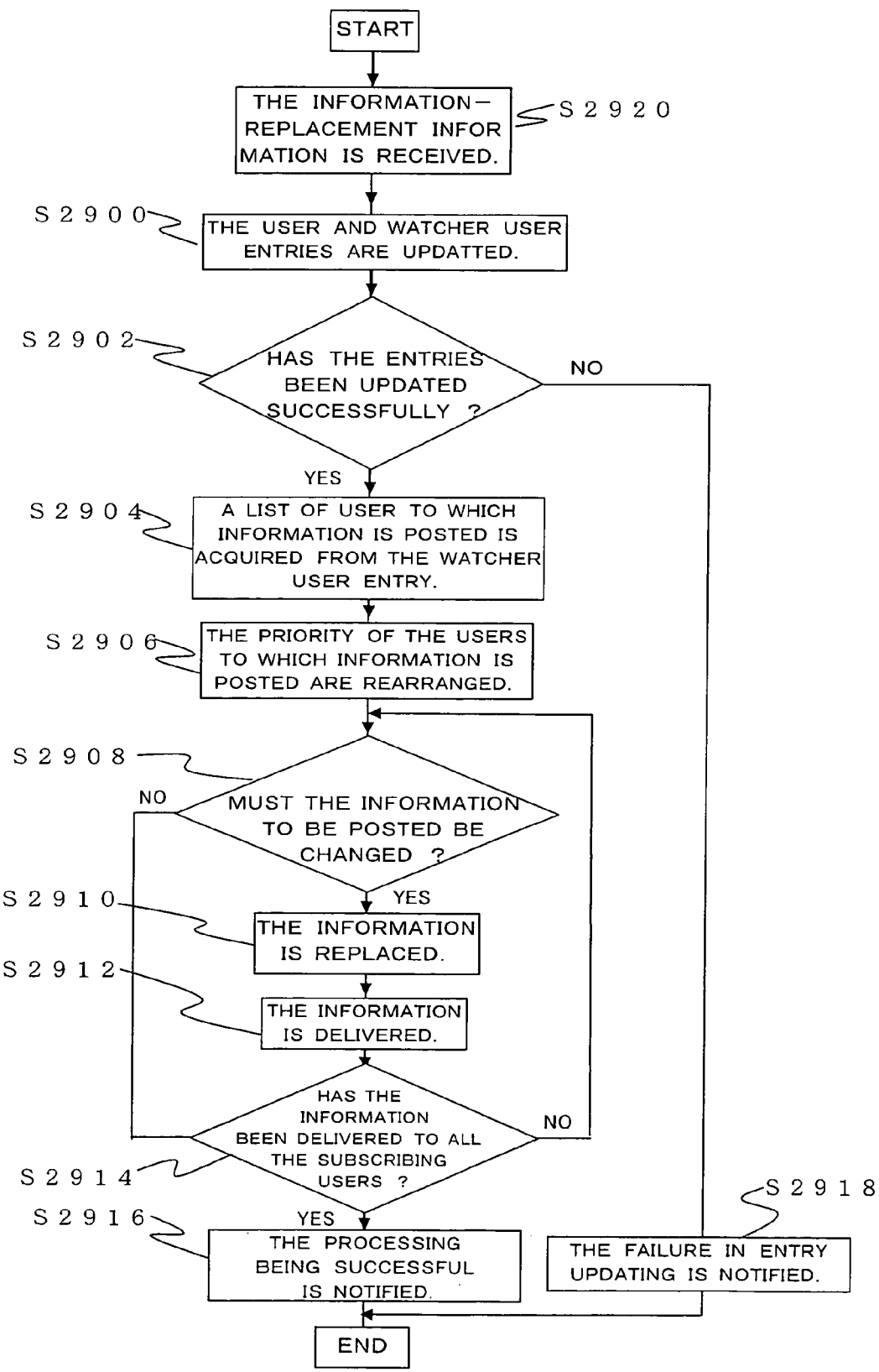
FIG. 29 is a flowchart showing an information setup/posting process with information replacement.
Figure 30:
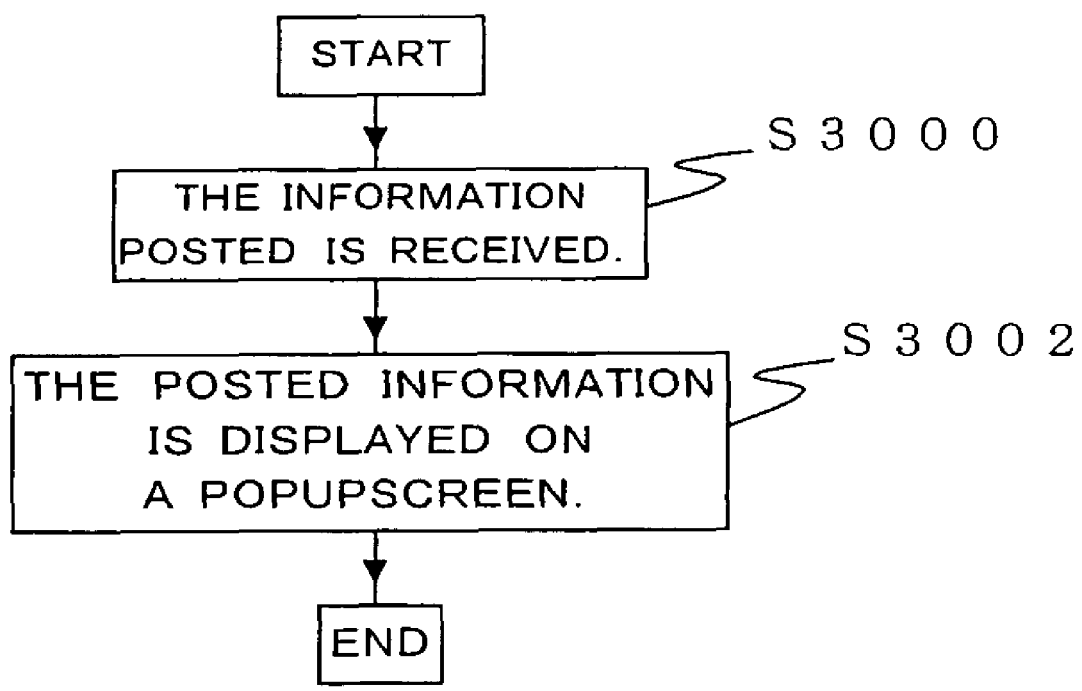
FIG. 30 is a flowchart showing an information posting process.

When information-replacement setup information is received from the user client 2 (s2920 in FIG. 29), the user entry and the watcher user entry are updated (S2900 in FIG. 29). When the result of determination of whether entry updating is successful indicates a success ("YES" in step S2902 in FIG. 29), a list of users to which information is posted is acquired from the watcher user entry (S2904 in FIG. 29), and the priorities of the users to which information is posted are rearranged (S2906 in FIG. 29). When the result of determination of whether information to be posted must be changed indicates that the information must be changed ("YES" in step S2908 in FIG. 29), among the rearranged priorities, the setup information from the user client 2 is replaced by that of a user which has a designated priority and which is not designated as one to which information is posted (S2910 in FIG. 29). The information is delivered to the information-posted users in the order of the priorities (S2912 in FIG. 29), and it is determined whether the information has been posted to all the subscribing users. When it is affirmatively determined ("YES" in step S2914), success information is transmitted to the user client 2 (S2916 in FIG. 29), and the information-replacement information setup/posting process ends. When the information to be posted must not be changed in step S2908, that is, when information replacement is not required ("NO" in step S2908 in FIG. 29), the process jumps to step S2912. When the entry updating fails in step S2902 ("NO" in step S2902 in FIG. 29), the user client 2 is notified of the failure (S2918 in FIG. 29), and the information-replacement information setup/posting process ends. As FIG. 30 shows, each user to which the information is posted receives the posted information (S3000 in FIG. 30) and the user's display unit displays the posted information on a popup screen (S3002 in FIG. 30). In the above processing, it is preferable to transmit asynchronously a response for notifying the acceptance of information from the user client 2 as a next step to s2920 in FIG. 29. Further it is also preferable to deliver asynchronously the result information in s2916 and S 2918 in FIG. 29.

In the second embodiment, a party that sets up information enters replacement information. However, in accordance with delivery priorities, the information delivery apparatus 1 may change information to be posted, such as posting of entire information to users having high priorities in delivery, and posting of the fact of a change to users having low priorities in delivery.

Although the second embodiment describes a case having a single replacement condition, a plurality of replacement conditions may be set.

Third Embodiment

Figure 31:
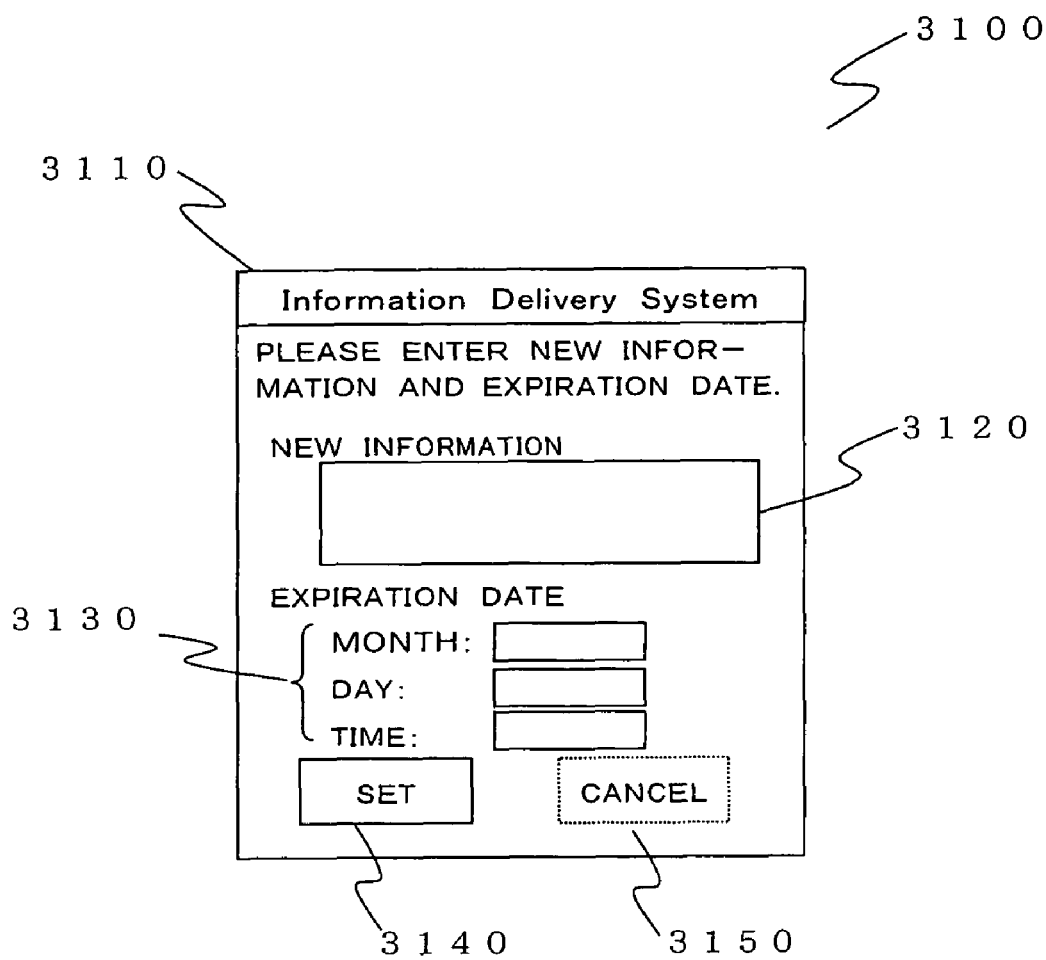
FIG. 31 is an illustration of an example of an information setup screen shot including an expiration date and time.

An information delivery apparatus 1 according to a third embodiment of the present invention may be identical in configuration to the information delivery apparatus 1 according to the first embodiment, and is configured to set an expiration date and time for information to be delivered. The information delivery apparatus 1 according to the third embodiment is described with reference to FIGS. 31 to 34. FIG. 31 shows an example of an information setup screen shot which includes an expiration date and time (which are shown as 3130 in FIG. 31) and which is displayed on the display unit 25 or 35 in the user client 2 when an expiration date and time is set for the information to be delivered. This information setup screen is selectively displayed by selecting the "SET" item 114 of the menu part on the client software screen shown in FIG. 5 (S3220 in FIG. 32).

Figure 32:
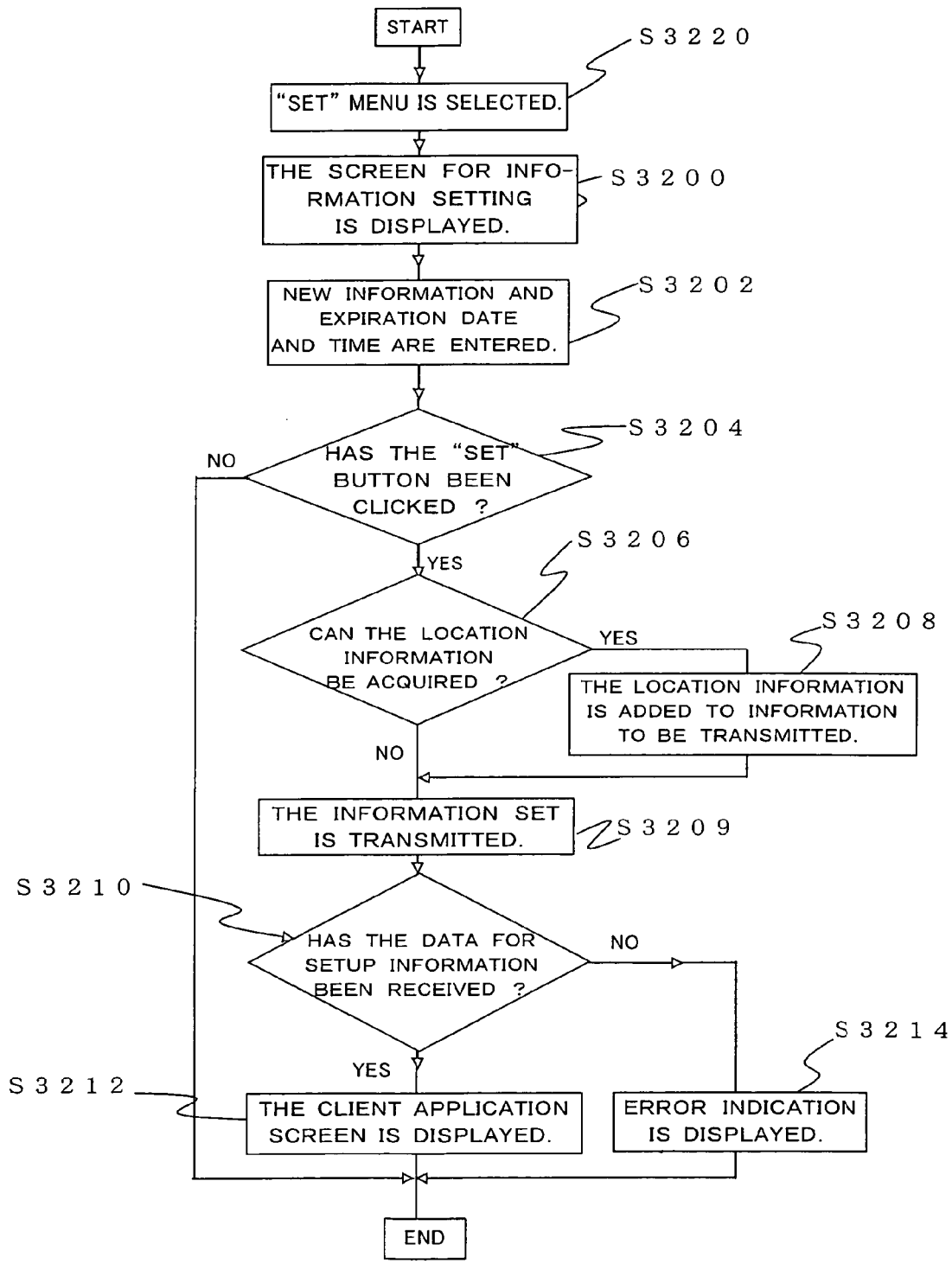
FIG. 32 is a flowchart showing an information updating process in which an expiration date and time is set.

The information to be set (i.e., information to be delivered) is entered in the "NEW INFORMATION" field 3120 shown in FIG. 31, and an expiration date and time of posting the information is set (S3202 in FIG. 32). When no expiration date and time is entered, the information is posted in the descending order of priorities in delivery unless the other condition is satisfied. By entering the information (to be delivered) and the expiration date and time and clicking on the "SET" button 3140 ("YES" in step S3204 in FIG. 32), it is determined whether location information can be added to the information (to be transmitted to the information delivery apparatus 1) (steps S3206 and S3208 in FIG. 32). The information for which the expiration date and time is set is transmitted to the processing unit 42 in the information delivery apparatus 1, with/without the location information (S3209 in FIG. 32). When the transmitted information is successfully set in the information delivery apparatus 1 ("YES" in step S3210 in FIG. 32), the client software screen such as show in FIG. 5 is displayed on the display unit 25 of the user client 2 (S3212 in FIG. 32). When the transmitted information fails in setting in the information delivery apparatus 1 ("NO" in step S3210 in FIG. 32), an error message is displayed on the display unit 25 of the user client 2 (S3214 in FIG. 32). After the step of S3212 or S3214, the processing to set the expiration date and time for information to be delivered ends. Also, when the "CANCEL" button 3150 is clicked on in step S3204, the information updating process, in which an expiration date and time is set, ends.

Figure 33:
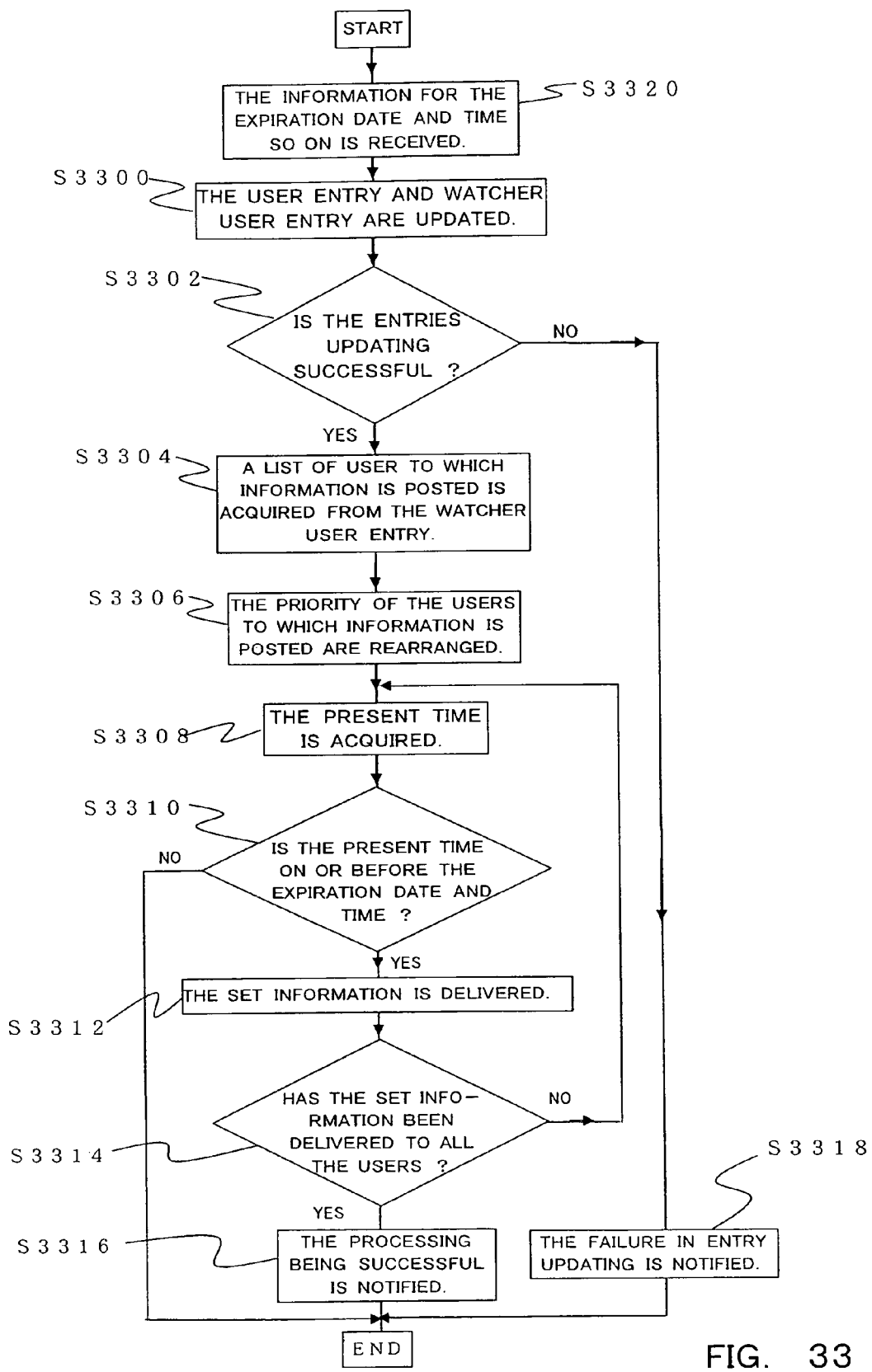
FIG. 33 is a flowchart showing an information setup/posting process in which an expiration date and time is set.
Figure 34:
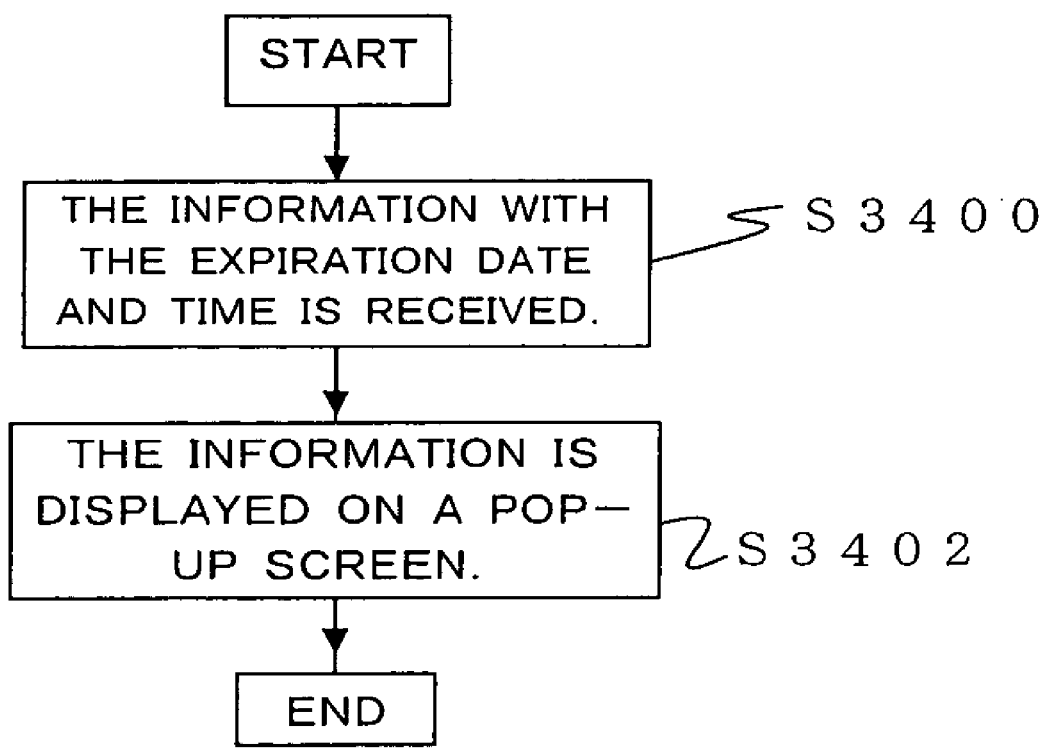
FIG. 34 is a flowchart showing an information posting process in which an expiration date and time is set.

Next, an information setup/posting process of the information delivery apparatus 1 in which an expiration date and time is set is described below with reference to FIG. 33.

After the information with the expiration date and time is transmitted from the user client 2 (S3320 in FIG. 33), the user entry and the watcher user entry are updated in step S3300. When the entry updating is successful ("YES" in step S3302 in FIG. 33), a list of users to which the information with the expiration date and time is posted (delivered) is acquired from the watcher user entry (S3304 in FIG. 33), and the priorities of the users are rearranged (S3306 in FIG. 33). Preferably, by referring to a clock built into the information delivery apparatus 1, the present time is acquired (S3308 in FIG. 33), and based on the present time and the expiration date and time included in the set information, it is determined whether the present time is on or before the expiration date and time. When the present time is on or before the expiration date and time ("YES" in step S3310 in FIG. 33), the set information with the expiration date and time is delivered to the users (S3312 in FIG. 33). It is determined whether the set information with the expiration date and time has been posted (delivered) to all the users. When identification information affirmatively determined, the information setup/posting process in which the expiration date and time is set is regarded as successful and ends (s3314 and S3316 in FIG. 33). When there is a user to which the information has not been delivered yet ("NO" in step S3314 in FIG. 33), the information setup/posting process returns to S3308 and continues processing. In addition, when the entry updating fails in step S3302 ("NO" in step S3302 in FIG. 33), the failure is returned to the user client 2 (s3318 in FIG. 33). When the expiration date and time has expired in step S3310, the information setup/posting process ends. When the information is delivered to a user (S3400 in FIG. 34), for the user, the information is displayed on a popup screen on the display unit 25 or the like, which is in use (S3402 in FIG. 34).

In the third embodiment, the client sets a date and time as a validity range (a period of validity/an expiration date and time). However, the client may set up to one hundred users having high information-updating frequencies.

Moreover, the information delivery apparatus 1 can perform operations such as delivery of information to only a fixed number of users having high priorities, and a manner in which, when information of the same transmitting user is updated during delivery, subsequent delivery is interrupted.

Fourth Embodiment

Also an information delivery apparatus 1 according to a fourth embodiment of the present invention may be identical in configuration to the information delivery apparatus 1 according to the first embodiment, and has a feature in that, in the case of posting an information change, not only information changed by the client, but also information of the priority in delivery of a user to which the change is posted is delivered. This operation is shown in flowcharts identical to those shown in FIGS. 20 to 22.

Fifth Embodiment

Figure 35:
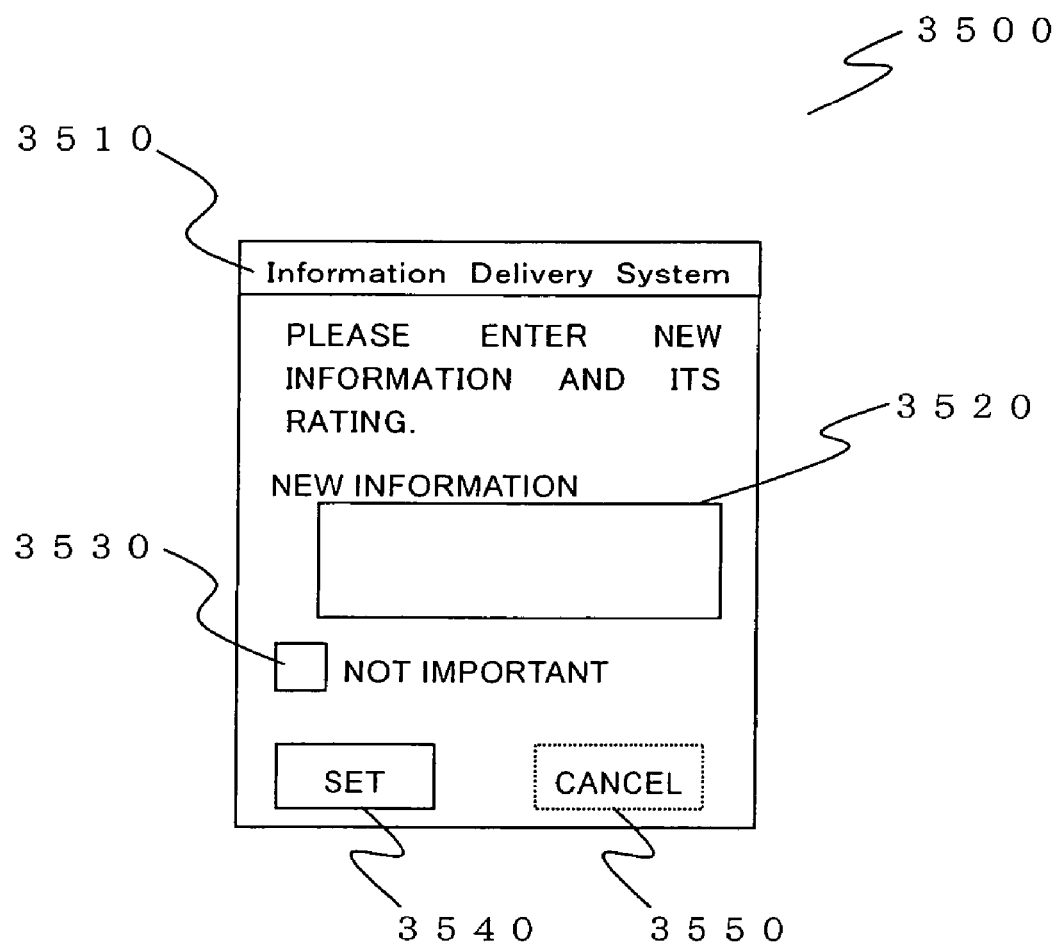
FIG. 35 is an illustration of an example of an information setup screen shot including an attribute.

Also an information delivery apparatus according to a fifth embodiment of the present invention may be identical in configuration to the information delivery apparatus 1 according to the first embodiment, and has a feature in that, when a user sets up information, an attribute, such as the level of importance of the information, is set. FIG. 35 shows a screen 3500 used when information is set up, with a level of importance set for the information. When the "NOT IMPORTANT" check box 3530 in FIG. 35 located below an information field 3520 is checked on the screen shown in FIG. 35, the set-up information and the level of importance are transmitted to a program of the processing unit 42 in the information delivery apparatus 1. The program sets delivery order for posting the information and does not post the information. The delivery order in this case is watcher-user-entry order, etc.

Figure 36:
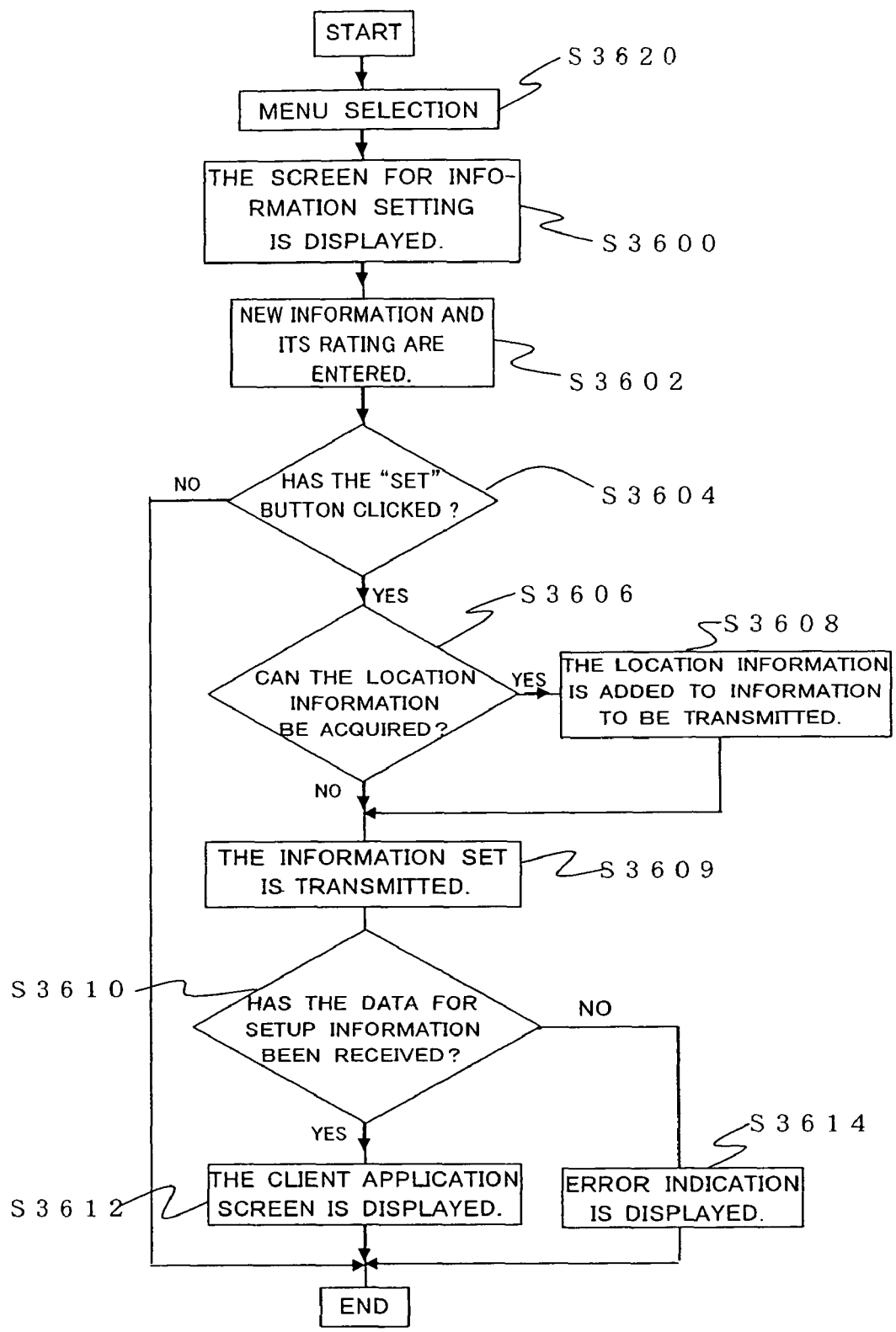
FIG. 36 is a flowchart showing an attribute-added information updating process.
Figure 37:
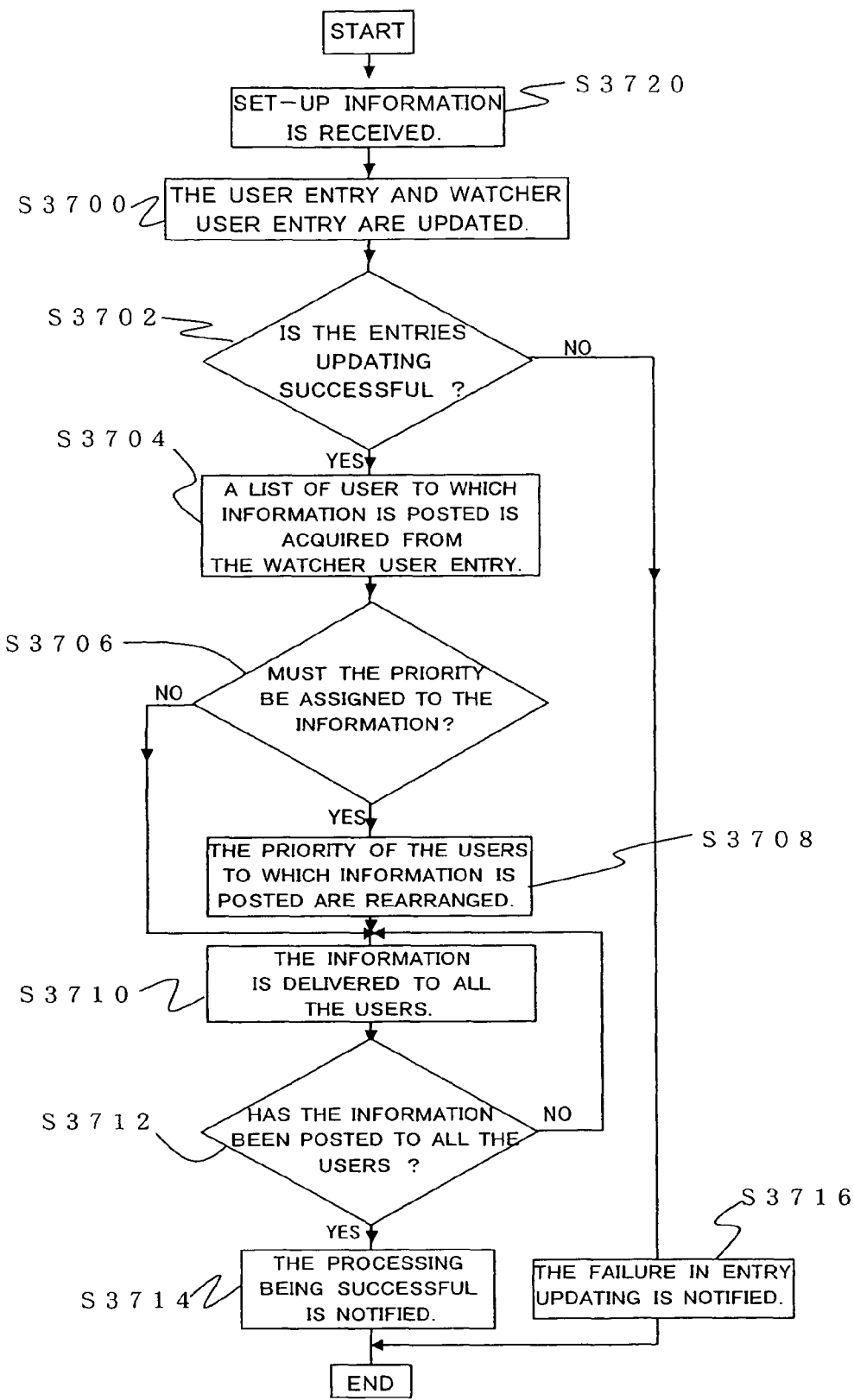
FIG. 37 is a flowchart showing an attribute-added information setup/posting process.

Conversely, for an important attribute, an "IMPORTANT" check box (not shown) may be checked. Also, the client does not set a level-of-importance attribute for each set item, but the information delivery apparatus 1 can determine the level of importance based on the user ID of a transmitting user, and can determine not to assign priorities in a case in which only location information is transmitted. Processes in the fifth embodiment of the client and the information delivery apparatus 1 are shown in the flowcharts shown in FIGS. 36 and 37, respectively. The process of the client in FIG. 36 only differs from the process in FIG. 32 in information to be set up. In the process of the information delivery apparatus 1, the set-up information is received (S3720 in FIG. 37), and the user entry and the watcher user entry are updated (S3700 in FIG. 37). When entry updating is successful ("YES" in step S3702 in FIG. 37), a list of users to which information is posted is acquired from the watcher user entry (S3704 in FIG. 37), and it is determined whether priority must be assigned to the information (S3706 in FIG. 37). When it is affirmatively determined ("YES" in step S3706 in FIG. 37), the priorities of the users on the list are rearranged (S3706 in FIG. 37). After that, the information is posted to all the users on the list (S3710 in FIG. 37). It is determined whether the information has been posted to all the users on the list (S3712 in FIG. 37). When it is affirmatively determined ("YES" in step S3714), the process is regarded as successful (S3714 in FIG. 37) and ends. Conversely, when it is negatively determined ("NO" in step S3712), the process returns to step S3710. When the priority must not be assigned in step S3706, the process proceeds to step S3706. When the entry updating fails in step S3702, the process is regarded as unsuccessful and ends.

In each of the above embodiments, a relatively short message is exemplified as information to be set up (delivered) by the user, but the information is not limited to the short message.

The information in each of the above embodiments includes both "PRESENCE" and "MESSAGING" in Instant Message Service, and may include general information other than them.

What is claimed is:

1. An apparatus for delivering information to a plurality of user terminals, comprising:
   a storage unit storing first and second groups of data,
      the first group of data including a combination of first identification data, first index data corresponding to the first identification data, and second index data assigned to a second user terminal to which first information data associated with the first identification data is delivered, and
      the second group of data including a combination of the first identification data, the first information data, second identification data identifying a second user terminal and corresponding to the second index data, and profile data related to the second identification data and provided by the second user terminal, and the second group of data being assigned with the first index data; and
   a processor to perform a process for allowing entry of updated information into said storage unit to update said first information data, and to perform a process for determining an order of the plurality of the second user terminals for delivering the updated information data according to the profile data acquired by reference to the second group of data in said storage unit when the first information data is updated, the updated first information data being delivered according to the order.

2. The apparatus of claim 1, wherein the processor performs a process for detecting restriction data with respect to a restriction on delivering the updated first information data, the restriction data being included in the updated first information data, and a process for determining whether the updated first information data is delivered according to the restriction data.

3. The apparatus of claim 1 wherein the processor performs a process for detecting restriction data with respect to a restriction on delivering the updated first information data, the restriction data being included in the first updated information data, and a process for determining the order according to the restriction data.

4. The apparatus of claim 2, wherein the restriction data is responsive to a date on which the updated first information data is delivered.

5. The apparatus of claim 1, wherein the processor performs a process for adding a datum responsive to the order to the updated first information data.

6. The apparatus of claim 1, wherein the processor performs a process for receiving order information data and instruction data for changing the updated first information data, the order information data being responsive to the order for delivering the updated first information data, and a process for changing the updated first information data according to the instruction data.

7. The apparatus of claim 1, wherein the profile data includes at least one of a datum responsive to a present status of a user of the user terminal, a datum responsive to a type of the user terminal, a datum of a location datum of the user terminal, a datum responsive to an order in which the first information data was delivered to the user terminal, a datum responsive to communication history, a datum responsive to a frequency of updating information transmitted from the user terminal, a datum responsive to a last updating date and time of information transmitted from the user terminal, and a datum responsive to whether a charge for reception of the first information is paid or not paid.

8. The apparatus of claim 1, wherein the first information data includes a plurality of first information data which are different from each other, each first information data is assigned an order, and the first information data is delivered to the user terminal corresponding to the order.

9. A method of information delivery comprising:
   receiving information from a user terminal;
   obtaining identification information identifying a user terminal to which the information is to be delivered, and an index assigned to the information;
   obtaining profile information from a user terminal requiring delivery of the information;
   storing the profile information according to the identification information at each index;
   receiving updated information updating the information; and
   determining an order of a plurality of the user terminals to receive information assigned at each index for delivering the updated information when the information is updated, the updated information being delivered according to the order.

10. The method of claim 9, wherein the profile data includes at least one of a datum responsive to a present status of a user of the user terminal, a datum responsive to a type of the user terminal, a datum of a positional datum of the user terminal, a datum responsive to the order in which the information was delivered to the user terminal, a datum responsive to communication history, a datum responsive to a frequency of updating information transmitted from the user terminal, a datum responsive to a last updating date and time of information transmitted from the user terminal, and a datum responsive to whether a charge for reception of the information is paid or not paid.

11. An apparatus to deliver information to a plurality of user terminals, comprising:
   a storage; and
   a processor which performs processes, including:
      receiving information from a user terminal,
      obtaining identification information identifying a user terminal to which the information is to be delivered, and an index assigned to the information,
      obtaining profile information from a user terminal requiring delivery of the information,
      storing, on the storage, the profile information according to the identification information at each index,
      receiving updated information updating the information, and
      determining an order of a plurality of the user terminals to receive information assigned at each index for delivering the updated information when the information is updated, the updated information being delivered according to the order.

* * * * *